United States Patent
Wang et al.

(10) Patent No.: US 11,363,633 B2
(45) Date of Patent: Jun. 14, 2022

(54) DEVICE AND METHOD IN RADIO COMMUNICATION SYSTEM, AND RADIO COMMUNICATION SYSTEM

(71) Applicants: SONY CORPORATION, Tokyo (JP); Wei Wang, Jiangsu (CN); Yuan Zhang, Jiangsu (CN); Pingping Xu, Jiangsu (CN); Bingshan Hu, Beijing (CN); Pen-shun Lu, Beijing (CN)

(72) Inventors: Wei Wang, Jiangsu (CN); Yuan Zhang, Jiangsu (CN); Pingping Xu, Jiangsu (CN); Bingshan Hu, Beijing (CN); Pen-shun Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 683 days.

(21) Appl. No.: 16/088,956

(22) PCT Filed: Mar. 22, 2017

(86) PCT No.: PCT/CN2017/077633
§ 371 (c)(1),
(2) Date: Sep. 27, 2018

(87) PCT Pub. No.: WO2017/167083
PCT Pub. Date: Oct. 5, 2017

(65) Prior Publication Data
US 2020/0329498 A1 Oct. 15, 2020

(30) Foreign Application Priority Data
Mar. 30, 2016 (CN) .......................... 201610191483.7

(51) Int. Cl.
*H04W 74/08* (2009.01)
*H04W 16/14* (2009.01)

(52) U.S. Cl.
CPC ....... *H04W 74/0816* (2013.01); *H04W 16/14* (2013.01)

(58) Field of Classification Search
None
See application file for complete search history.

(56) References Cited

U.S. PATENT DOCUMENTS

2008/0177886 A1 * 7/2008 Singh .................... H04W 28/26
709/228
2008/0270125 A1 10/2008 Choo et al.
(Continued)

FOREIGN PATENT DOCUMENTS

| CN | 104333873 A | 2/2015 |
| CN | 104363657 A | 2/2015 |

(Continued)

OTHER PUBLICATIONS

Office Action dated Oct. 7, 2020 in European Patent Application No. 17 773 113.0, 21 pages.
(Continued)

*Primary Examiner* — James P Duffy
(74) *Attorney, Agent, or Firm* — Xsensus LLP

(57) ABSTRACT

A device at a transmitting side includes a channel detection unit configured to detect whether a transmitting-end channel in an unlicensed frequency band is idle; and a coordination unit configured to enable, if the transmitting-end channel is idle, the transmitting side to broadcast an inter-operator coordination signal before transmitting a data stream, so as to realize information interaction between apparatuses of different operators, wherein the inter-operator coordination signal implements, by means of presence/absence of energy in a specified frequency band, an energy pattern signal on a time-frequency domain plane for the information interaction between the apparatuses of different operators. By enabling inter-operator information interaction in an unlicensed fre-
(Continued)

quency band by means of an energy pattern signal, the embodiments of the present disclosure eliminate difficulties of reception and demodulation for signal detection between apparatuses of different operators, thus effectively realizing coordination between the apparatuses of different operators, and improving system performance.

18 Claims, 15 Drawing Sheets

(56) References Cited

U.S. PATENT DOCUMENTS

| | | |
|---|---|---|
| 2015/0103782 A1 | 4/2015 | Xu et al. |
| 2015/0110012 A1 | 4/2015 | Bhushan et al. |
| 2015/0171948 A1 | 6/2015 | Xiao et al. |
| 2015/0208410 A1 | 7/2015 | Koutsimanis et al. |
| 2015/0294673 A1 | 10/2015 | Kawashima et al. |
| 2015/0296385 A1 | 10/2015 | Zhang et al. |
| 2015/0312901 A1 | 10/2015 | Yoshizawa et al. |
| 2015/0349931 A1 | 12/2015 | Damnjanovic et al. |

FOREIGN PATENT DOCUMENTS

| | | |
|---|---|---|
| CN | 104717686 A | 6/2015 |
| WO | 03/024049 A1 | 3/2003 |
| WO | 2013131257 A1 | 9/2013 |
| WO | 2015169359 A1 | 11/2015 |
| WO | 2016013387 A1 | 1/2016 |

OTHER PUBLICATIONS

Extended European Search Report dated Nov. 28, 2018 in European Application No. 17773443.0-1214.

"Candidate solutions for LAA operation", 3GRP Draft; RI-144042 LAA Candidate Solutions Final, 3rd Generation Partnership Project (3GPP), vol. RAN WGI, Oct. 6, 2014-Oct. 10, 2014, (Sep. 27, 2014), XP050869704, Retrieved from the Internet: URL:http://www.3gpp.org/ftp/tsg -ran/WGI -RL 1/TSGRI 78b/Docs/ [retrieved on Sep. 27, 2014].

\* cited by examiner

DEVICE AND METHOD IN RADIO COMMUNICATION SYSTEM, AND RADIO COMMUNICATION SYSTEM

The present application claims the priority of Chinese Patent Application No. 201610191483.7, entitled "DEVICE AND METHOD IN RADIO COMMUNICATION SYSTEM, AND RADIO COMMUNICATION SYSTEM" filed with the Chinese Patent Office on Mar. 30, 2016, the entire contents of which are incorporated herein by reference.

FIELD OF THE INVENTION

The present disclosure relates to the technical field of wireless communication, and more particularly to a device and method in a wireless communication system in particular a Licensed Assisted Access (LAA) system and the wireless communication system, which can realize information interaction between apparatuses of different operators in the wireless communication system in order to solve the problem of coordination between the apparatuses of different operators on an unlicensed frequency band.

BACKGROUND OF THE INVENTION

Deployment of wireless network apparatuses in the future will be denser such that a plurality of operators using different physical layer techniques will possibly exist within a limited geographical area. Differing from the traditional LTE system, a LAA framework has broader transmittable bandwidths. On an unlicensed frequency band, different operators possibly compete for a same channel, making conflictions of data transmission inevitable. If different cells whose geographical positions are overlapped can recognize each other, a corresponding conflictions avoidance mechanism can be used to improve a channel utilization rate. A Wi-Fi system realizes recognition of different service sets by overlapping colorings of basic service sets, and a traditional LTE operator purchases different frequency bands to perform data transmission, so the problem that different operators compete for a same channel does not exist.

The inter-operator coordination schemes proposed in the existing documents are mainly used for licensing spectrum sharing between frequency bands. In the traditional spectrum allocation scheme, a single operator separately shares a spectrum such that a spectrum utilization rate is low. To solve this problem, the existing documents propose a main-channel sharing scheme, that is, a plurality of operators in common purchase a same channel and coordinately use resources of the same channel. Different operators possibly use different physical layer techniques, resulting in difficulties in decoding between the operators, so the current inter-operator coordination scheme mainly starts from both aspects of frequency selection and power control. The existing inter-operator coordination schemes segment a spectrum into a plurality of small blocks such that apparatuses of different operators perform dynamic frequency selection, or construct a frequency pool to ensure conflicting frequencies selected by different operators to be minimum through different channel selection algorithms, or reduce conflictions between apparatuses of operators as far as possible through power control. However, for most of the current operators, purchasing of licensed frequency bands have been completed, and use of unlicensed frequency bands is limited, so they cannot apply the inter-operator coordination scheme of the above licensed frequency bands directly to the unlicensed frequency bands.

For inter-operator coordination on an unlicensed frequency band, first, it is necessary to solve the problem of recognition of different operators. A Public Land Mobile Network ID (PLMN ID) of the LTE system may be used to recognized different operators. The plurality of standardized schemes proposed by Qualcomm Incorporated, in which it is proposed to use a reference signal such as a Channel State Information-Reference Signal (CSI-RS) and so on to carry a PLMN ID, may be used for recognition of different operators, and is possibly further used in an interaction process between operators. However, the existing documents also mention that a same reference signal cannot carry a plurality of PLMN IDs; for the existing standard reference signals, reference signal formats of cells of different operators are possibly the same, resulting in conflictions of recognition; moreover, due to problems such as synchronization, alignment and so on between different operators, it is possibly necessary to repeatedly send PLMN IDs in order to produce the effect that different operators recognize each other. In addition, information carried by the PLMN IDs is limited, and possibly will not be demodulated correctly if interference occurs during transmission, and thus is possibly not applicable to inter-operator coordination on an unlicensed frequency band.

SUMMARY OF THE INVENTION

A brief summary of the present disclosure is given below, to provide a basic understanding of some aspects of the present disclosure. However, it should be understood that the summary is not an exhaustive summary of the present disclosure; it does not intend to define a key or important part of the present disclosure, nor does it intend to limit the scope of the present disclosure. The object of the summary is only to briefly present some concepts, which serves as a preamble of the detailed description that follows.

In view of the foregoing circumstances, an object of the present disclosure is to provide a mechanism of inter-operator coordination on an unlicensed frequency band applicable to a wireless communication system which sufficiently considers difficulties in reception and demodulation for signal detection between apparatuses of different operators, realizes inter-operator information interaction by carrying information utilizing an energy signal, thus effectively realizing coordination between the apparatuses of different operators so as to avoid conflictions.

According to an aspect of the present disclosure, there is provided device at transmitting side in a wireless communication system, the device comprising: a channel detecting unit configured to detect whether a transmitting side channel on an unlicensed frequency band is idle; and a coordinating unit configured to cause, in a case where the transmitting side channel is idle, the transmitting side to broadcast an inter-operator coordination signal before transmitting a data stream, so as to realize information interaction between apparatuses of different operators, wherein the inter-operator coordination signal is an energy pattern signal on a time domain-frequency domain plane utilizing presence absence of energy on a specified frequency band to realize the information interaction between the apparatuses of different operators.

According to a preferred embodiment of the present disclosure, the inter-operator coordination signal includes at least one of a flag pattern and a link information pattern, the flag pattern being a periodic repeated energy pattern for which positions of sub-carriers carrying energy are predetermined, and the link information pattern being an encodable energy pattern for winch positions and durations of sub-carriers carrying energy are variable.

According to another preferred embodiment of the present disclosure, the flag pattern is used to indicate start of the inter-operator coordination signal, and the link information pattern is used to carry link information.

According to another preferred embodiment of the present disclosure, the link information comprises one or more of device type and serial number at the transmitting side, device type and serial number at a receiving side, operator information and an estimated channel occupation time.

According to another preferred embodiment of the present disclosure, the flag pattern comprises one of a pectination stripe pattern, a sawteeth pattern and a chessboard pattern, and the link information pattern comprises one of a stripe pattern, a barcode pattern and a two-dimensional code pattern.

According to another preferred embodiment of the present disclosure, the coordinating unit is further configured to cause, in a case where a notification indicating that a receiving side channel is busy is received from a receiving side, the transmitting side to stop broadcasting the inter-operator coordination signal.

According to another preferred embodiment of the present disclosure, the coordinating unit is further configured to control, in a case of uplink transmission, the transmitting side to send an uplink scheduling request to a base station according to the inter-operator coordination signal broadcast by an apparatus of another operator.

According to another preferred embodiment of the present disclosure, the coordinating unit is further configured to report, in a case of uplink transmission, link information determined according to the inter-operator coordination signal broadcast by an apparatus of another operator to a base station, to perform uplink scheduling by the base station.

According to another preferred embodiment of the present disclosure, the coordinating unit is further configured to realize unification with the inter-operator coordination signal of an apparatus of another operator by adjusting number of sub-carriers and/or signal transmission duration of the inter-operator coordination signal.

According to another preferred embodiment of the present disclosure, the coordinating unit is further configured to adjust the number of sub-carriers and/or signal transmission duration of the inter-operator coordination signal according to a lease common multiple or a greatest common divisor of the number of sub-carriers and/or signal transmission duration of the inter-operator coordination signal.

According to another preferred embodiment of the present disclosure, the wireless communication system is a Licensed-Assisted Access system.

According to another preferred embodiment of the present disclosure, the device further comprises: a communication unit configured to perform signal transmission and reception.

According to another aspect of the present disclosure, there is further provided a device at receiving side in a wireless communication system, the device comprising: a channel detecting unit configured to detect whether a receiving side channel on an unlicensed frequency band is idle; and a coordinating unit configured to cause, in a case where the receiving side channel is idle, the receiving side to broadcast a shortened inter-operator coordination signal synchronously with an inter-operator coordination signal from a transmitting side, at a predetermined time after the inter-operator coordination signal broadcast by the transmitting side is received, so as to realize information interaction between apparatuses of different operators, wherein the inter-operator coordination signal is an energy pattern signal on a time domain-frequency domain plane utilizing presence absence of energy on a specified frequency band to realize the information interaction between the apparatuses of different operators.

According to another aspect of the present disclosure, there is further provided a wireless communication system, comprising: a transmitting apparatus comprising a first processing circuitry configured to: detect whether a transmitting side channel on an unlicensed frequency band is idle, and in a case where the transmitting side channel is idle, broadcast an inter-operator coordination signal before transmitting a data stream, so as to realize information interaction between apparatuses of different operators; and a receiving apparatus comprising a second processing circuitry configured to: detect whether a receiving side channel on the unlicensed frequency band is idle, and in a case where the receiving side channel is idle, broadcast a shortened inter-operator coordination signal synchronously with an inter-operator coordination signal from the transmitting apparatus, at a predetermined time after the inter-operator coordination signal broadcast by the transmitting apparatus is received, wherein the inter-operator coordination signal is an energy pattern signal on a time domain-frequency domain plane utilizing presence/absence of energy on a specified frequency band to realize the information interaction between the apparatuses of different operators.

According to another aspect of the present disclosure, there is further provided a method at transmitting side in a wireless communication system, the method comprising: detecting whether a transmitting side channel on an unlicensed frequency band is idle; and causing, in a case where the transmitting side channel is idle, the transmitting side to broadcast an inter-operator coordination signal before transmitting a data stream, so as to realize information interaction between apparatuses of different operators, wherein the inter-operator coordination signal is an energy pattern signal on a time domain-frequency domain plane utilizing presence/absence of energy on a specified frequency band to realize the information interaction between the apparatuses of different operators.

According to another aspect of the present disclosure, there is further provided a method at receiving side in a wireless communication system, the method comprising: detecting whether a receiving side channel on an unlicensed frequency band is idle, and causing, in a case where the receiving side channel is idle, the receiving side to broadcast a shortened inter-operator coordination signal synchronously with an inter-operator coordination signal from transmitting side, at a predetermined time after the inter-operator coordination signal broadcast by the transmitting side is received, so as to realize information interaction between apparatuses of different operators, wherein the inter-operator coordination signal is an energy pattern signal on a time domain-frequency domain plane utilizing presence/absence of energy on a specified frequency band to realize the information interaction between the apparatuses of different operators.

According to another aspect of the present disclosure, there is further provided an electronic device, which may comprise a receiver and one or more processors, wherein the one or more processors may be configured to implement the methods or the functions of the corresponding units in the above wireless communication systems according to the present disclosure.

According to other aspects of the present disclosure, there is further provided a computer program code and a computer program product for realizing the above method according to the present disclosure, and a computer readable storage medium having the computer program code for realizing the above method according to the present disclosure recorded thereon.

According to embodiments of the present disclosure, inter-operator information interaction is realized by carrying information utilizing an energy signal, such that difficulties in reception and demodulation for signal detection between apparatuses of different operators are eliminated, thus effectively realizing coordination between apparatuses of different operators on an unlicensed frequency band in a wireless communication system and improving system performance.

Other aspects of the embodiments of the present disclosure are given in the following specification part, wherein preferred embodiments for sufficiently disclosing the embodiments of the present disclosure are described in detail, without applying any limitation thereto.

BRIEF DESCRIPTION OF THE DRAWINGS

The present disclosure can be better understood with reference to the detailed description given below in combination with the appended drawings. Throughout the appended drawings, the same or similar reference signs are used to denote the same or similar components. The appended drawings together with the detailed description below are included in the specification and constitute a part of the specification to further illustrate the preferred embodiments of the present disclosure and explain the principles and advantages of the disclosure. In the appended drawings.

EMBODIMENTS OF THE INVENTION

Exemplary embodiments of the present disclosure will be described combined with the appended drawings below. For the sake of clarity and conciseness, the description does not describe all features of actual embodiments. However, it should be understood that in developing any such actual embodiment, many decisions specific to the embodiments must be made, so as to achieve specific objects of a developer; for example, those limitation conditions related to the system and services are met, and these limitation conditions possibly will vary as embodiments are different. In addition, it should be appreciated that although developing tasks are possibly complicated and time-consuming, such developing tasks are only routine tasks for those skilled in the art benefiting from the contents of the present disclosure.

It should also be noted herein that, to avoid the present disclosure from being obscured due to unnecessary details, only those device structures and/or processing steps closely related to the solution according to the present disclosure are shown in the appended drawings, while omitting other details not closely related to the present disclosure.

Next, embodiments of the present disclosure will be described with reference to FIG. 1 to FIG. 21.

Figure 1:
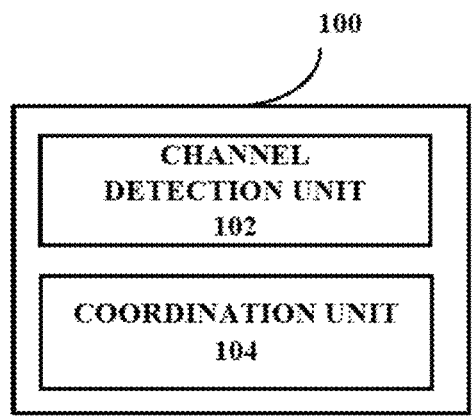
FIG. 1 is a block diagram showing a function configuration example of a device at transmitting side in a wireless communication system according to an embodiment of the present disclosure.

First, a function configuration example of a device at transmitting side in a wireless communication system according to an embodiment of the present disclosure will be described with reference to FIG. 1. FIG. 1 is a block diagram showing a function configuration example of a device at transmitting side in a wireless communication system according to an embodiment of the present disclosure.

As shown in FIG. 1, a device 100 according to the embodiment may comprise a signal detecting unit 102 and a coordinating unit 104.

The signal detecting unit 102 may be configured to detect whether a transmitting side channel on an unlicensed frequency band is idle. Specifically to avoid interference upon a link which already exists on a same frequency band, before transmitting a signal on the unlicensed frequency band, an apparatus shall first perform sensing, so as to ensure that the signal is transmitted only in a case where the channel is idle; this process may be called Listen-Before-Talk (LBT). The signal detecting unit 102 for example may detect whether the transmitting side channel is idle by adopting any manner well-known in the art, and the simplest manner is energy detection. If it is detected that energy on the current channel exceeds a predetermined energy threshold (for example, a Clear Channel Assessment (CCA) threshold), it is regarded that the current channel is busy, and otherwise it is regarded that the current channel is idle. As an example, assuming that the CCA threshold is −62 dBm, if it is detected that a value of energy in the transmitting side channel is higher than −62 dBm, it is regarded that the transmitting side channel is currently busy, and otherwise it is regarded that the transmitting side channel is idle.

It should be noted that although detecting whether a channel on an unlicensed frequency band is idle by adopting the manner of energy detection is described as an example herein, the present disclosure is not limited hereto. Rather, it is also possible to detect whether a channel is idle by adopting any other manner well-known in the art.

The coordinating unit 104 may be configured to cause, in a case where the transmitting side channel is idle, the transmitting side to broadcast an inter-operator coordination signal before transmitting a data stream, so as to realize information interaction between apparatuses of different operators.

The inter-operator coordination signal herein is an energy pattern signal on a time domain-frequency domain plane utilizing presence/absence of energy on a specified frequency band to realize the information interaction between the apparatuses of different operators, and may be called an IOC signal for short. Specifically, as stated above, the simplest channel detection manner is energy detection; thus, if presence/absence of energy on a specific sub-carrier is designed as a pattern, this energy pattern can be utilized to carry related link information, such that an apparatus which receives the inter-operator coordination signal can determine the link information carried by the signal by adopting the manner of energy detection, so as to realize information interaction between apparatuses of different operators, thus realizing coordination between the apparatuses of operators.

The present invention is carried out based on this design concept. By encoding an energy pattern signal, i.e., by setting presence/absence and durations of energy on respective frequency bands, a transformable pattern may be formed on time domain-frequency domain, and different patterns may correspond to different link information. Accordingly, in place of requiring both communication parties to know modulation coding schemes and codebooks of both the parties and thereby demodulating an electromagnetic wave signal so as to realize information interaction in the prior art, for the inter-operator coordination signal according to the present disclosure, information carried by the inter-operator coordination signal can be easily determined by merely detecting energy on respective sub-carriers, so as to easily realize information interaction between operators.

Figure 2:
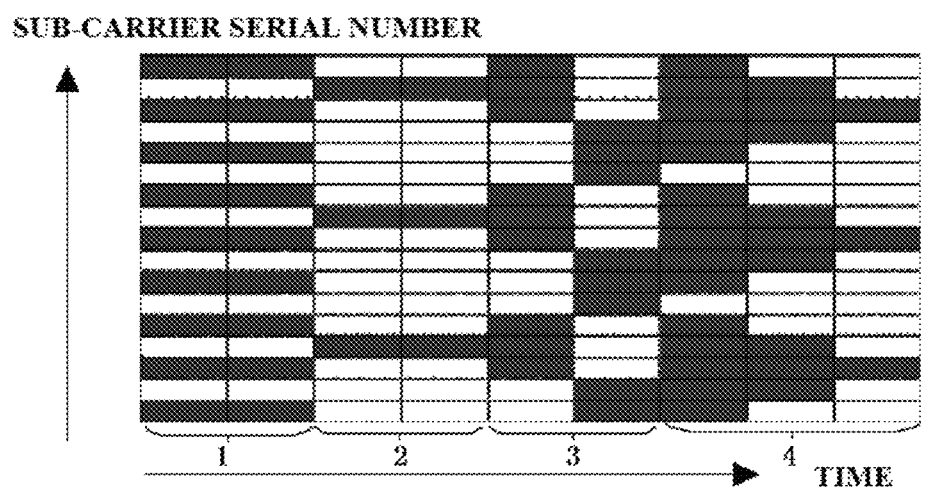
FIG. 2 is a schematic view showing a description of pattern representation of an Inter-Operator Coordination (IOC) signal according to an embodiment of the present disclosure.

FIG. 2 is a schematic view showing a description of pattern representation of an inter-operator coordination signal according to an embodiment of the present disclosure.

As shown in FIG. 2, the transverse axis represents time, and the longitudinal axis represents sub-carrier serial numbers; moreover, in tins example, it may be regarded that sub-carriers are arranged according to the magnitude of frequency, that is, sub-carrier serial number from low to high represent center frequencies of the sub-carriers from low to high. In FIG. 2, each grid represents a pattern cell, may be one or more sub-carrier widths on frequency domain, and may be one or more minimum time cells transmittable and detectable by an actual physical apparatus on time domain. In FIG. 2, shadowed grids represent presence of energy on these subcarriers, that is, there is signal transmission on these subcarriers, while blank grids represent absence of energy on these subcarriers, that is, there is no signal transmission on these subcarriers; this also applies to other figures.

Specifically, in the example as shown in FIG. 2: in a first part, every predetermined number of subcarriers, there is one or a few subcarriers on which energy is transmitted, and durations of the transmitted energy have equal lengths, exhibiting a strip pattern; in a second part, which is similar to the first part, strip spacings are unequal to strip widths; in a third part, during a first period of time, one group of energy is transmitted every one group of subcarriers, and during a second period of time, positions of subcarriers on which energy is transmitted are exchanged with positions of spaced subcarriers, exhibiting a chessboard pattern; in a fourth part, subcarrier transmission durations are unequal, and first progressively increase and then progressively decrease, exhibiting a symmetrical sawteeth shape.

As can be seen, by setting presence/absence of energy and durations of energy on respective frequency bands, an energy patient signal on time domain-frequency domain may be formed, and different energy pattern signals may correspond to different signal contents, thus making it possible to realize information transfer utilizing an energy pattern signal so as to achieve the object of interaction.

Preferably, the inter-operator coordination signal includes at least one of a flag pattern and a link information pattern, the flag pattern being a periodic repeated energy pattern for which positions of sub-carriers carrying energy are predetermined, and the link information pattern being an encodable energy pattern for which positions and durations of sub-carriers carrying energy are variable.

Figure 3A:
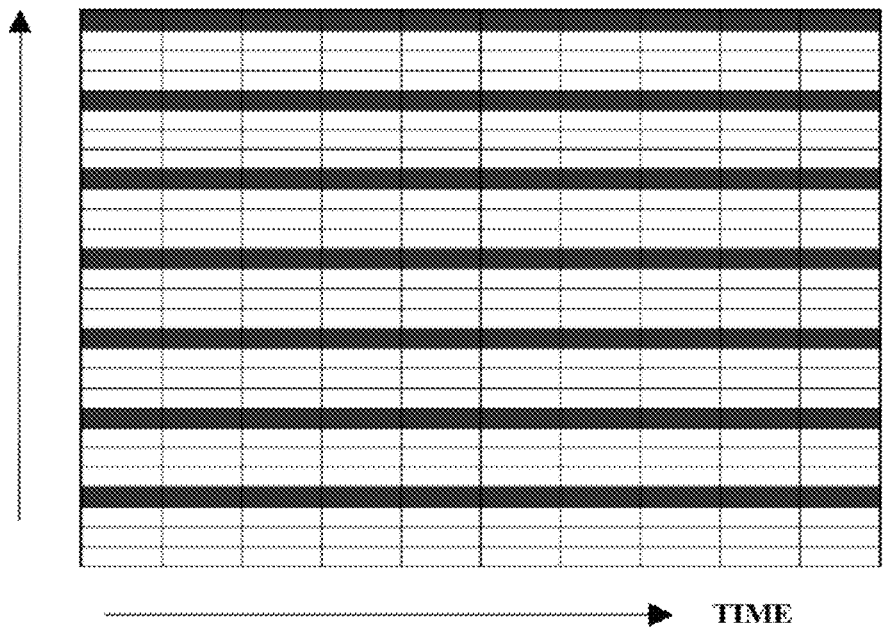
FIG. 3A to FIG. 3C are schematic views showing examples of a flag pattern of the inter-operator coordination signal according to an embodiment of the present disclosure.
Figure 3B:
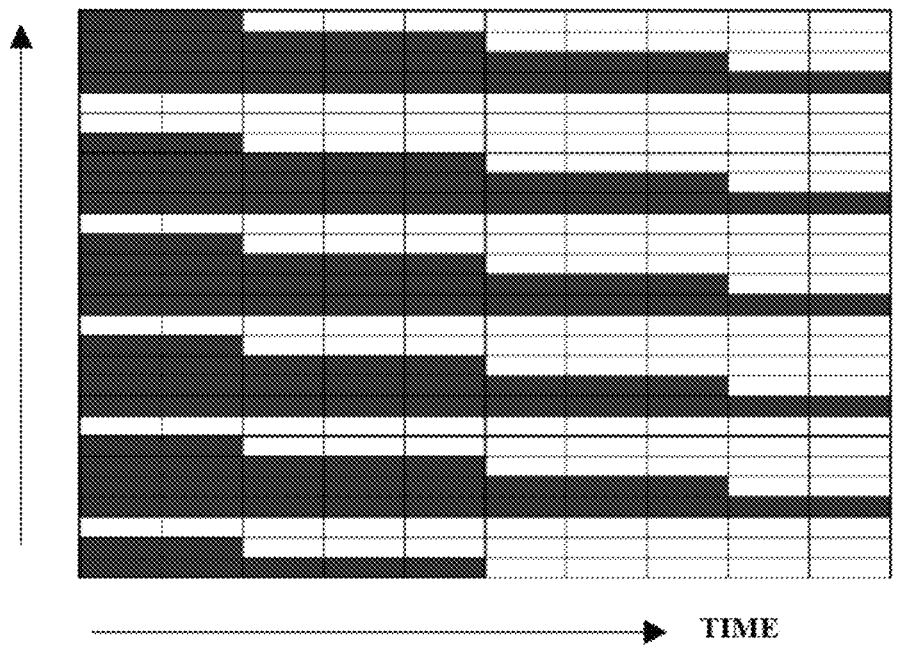
Figure 3C:
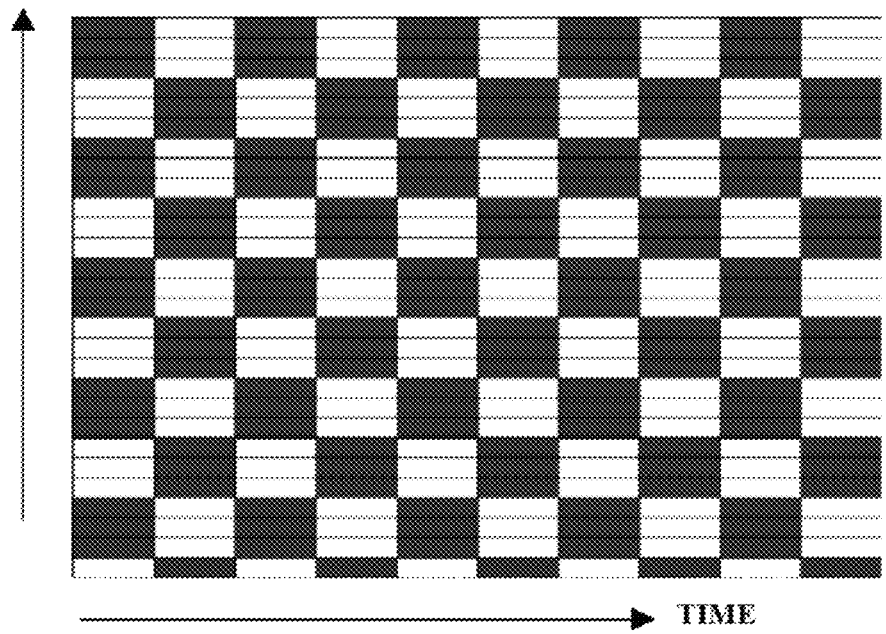

Specifically, for the flag pattern, a repeated pattern on time domain-frequency domain may be adopted; that is, sub-carriers at positions having a predetermined regularity are specified as appointed positions, an energy signal is transmitted on these appointed positions and the transmission lasts a predetermined time, so as to form a repeated pattern on time domain-frequency domain. FIG. 3A to FIG. 3C are schematic showing examples of the flag pattern, respectively. However, examples of the repeated pattern may comprise but are not limited to the pectination stripe pattern, the sawteeth pattern and the chessboard pattern as shown in FIG. 3A to FIG. 3C respectively, and any simple frequency domain repeated pattern signal can realize the function of the pattern signal. The flag pattern may be used to carry some simple information; taking the pectination stripe pattern as an example, widths and positions of strips may for example be used to distinguish different operators or carry some other simple information.

However, since the flag pattern is simple, the information carried by the flag pattern is very limited. The information carried by the simple repeated pattern is far from enough to realize information interaction between operators so as to achieve the object of effectively avoiding conflictions; thus, to save storage resources, an energy pattern shall be encodable to carry more abundant link information. As an exemplary encoding manner, for example, it is possible to encode positions carrying energy as 1 and to encode positions without energy as 0; such an energy pattern signal can be represented as a binary code sequence, and thereby can represent different link information. Of course, those skilled in the art can also envisage using other encoding manners, as long as encoding on energy positions and durations can be realized.

Figure 4A:
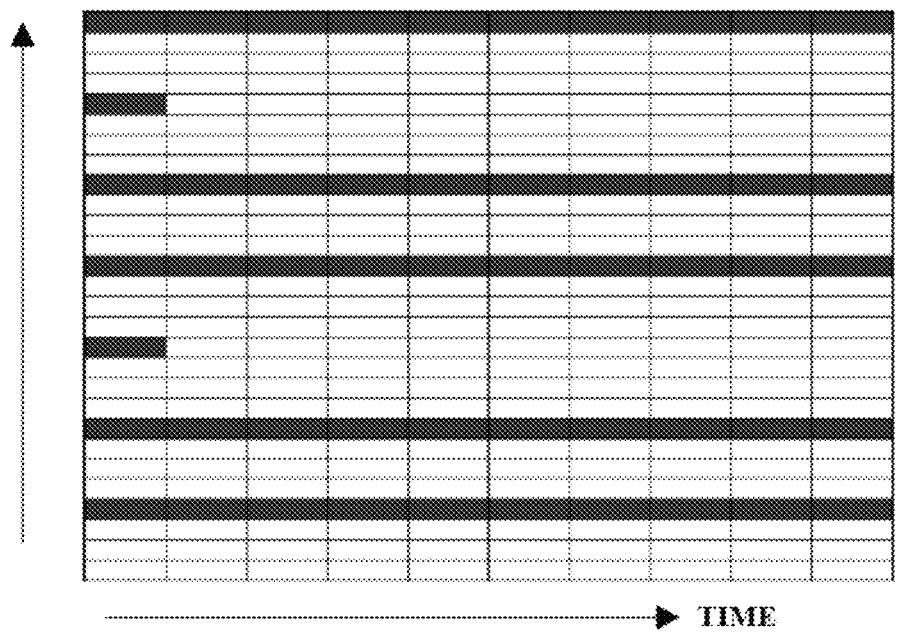
FIG. 4A to FIG. 4C are schematic views showing examples of a link information pattern of the inter-operator coordination signal according to an embodiment of the present disclosure.
Figure 4B:
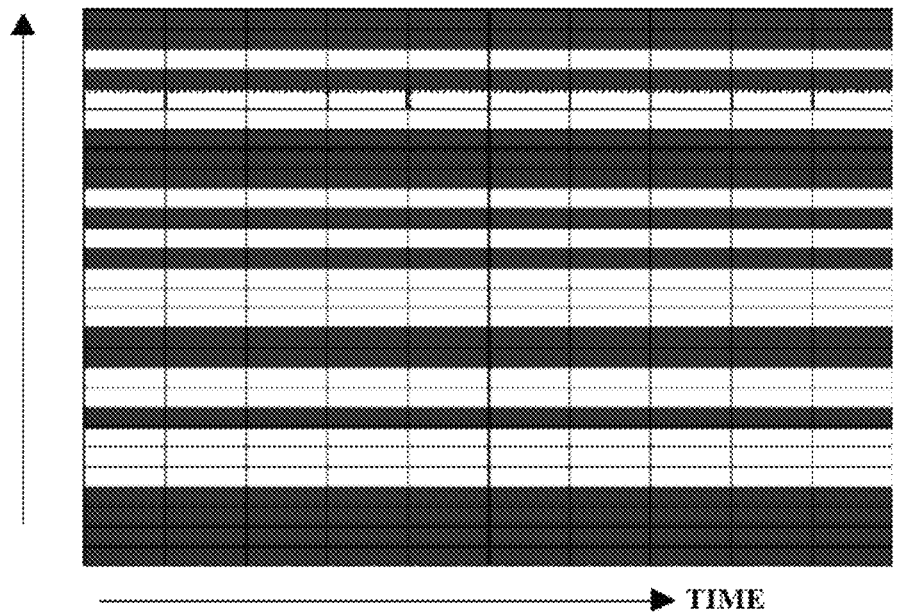
Figure 4C:
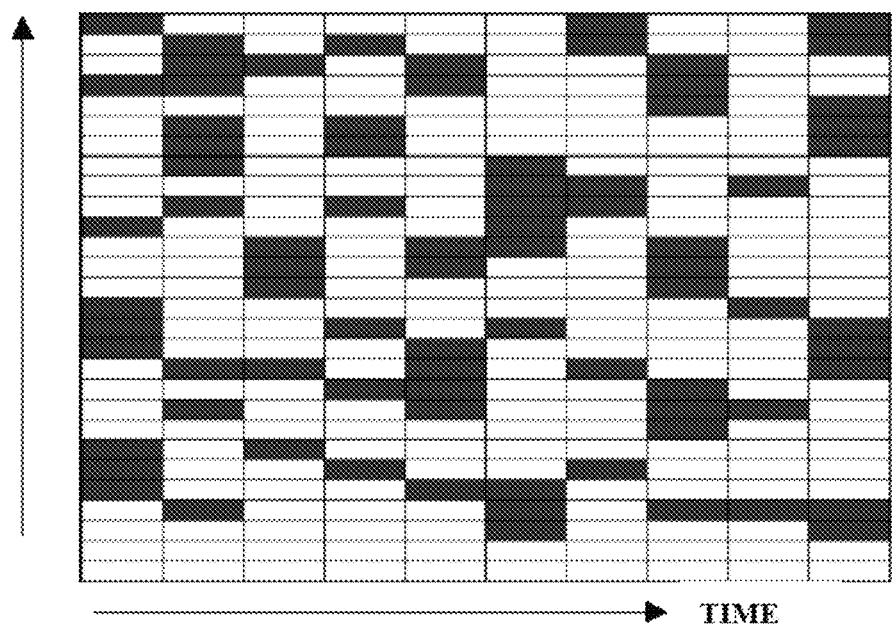

The link information patient is an irregular energy pattern formed on time domain-frequency domain by specifying positions and durations of sub-carriers carrying energy, for carrying complicated link information. The link information for example may comprise but is not limited to one or more of device type and serial number at the transmitting side, device type and serial number at a receiving side, operator information and an estimated channel occupation time. Accordingly, the apparatus which receives the inter-operator coordination signal can parse the link information pattern through energy detection, so as to obtain the related link information carried by the pattern, for realizing coordination between operators so as to avoid conflictions of data transmission. The link information may comprise but is not limited to a stripe pattern, a barcode pattern and a two-dimensional code pattern, and any irregular time domain-frequency domain energy pattern may be used to realize the function of the pattern signal. FIG. 4A to FIG. 4C illustrate exemplary forms of the link information pattern, respectively; for example. FIG. 4A illustrates an example of a specified binary coded strip pattern, FIG. 4B illustrates an example of a simple barcode pattern, and FIG. 4C illustrates an example of a simple two-dimensional pattern.

It should be noted that the above flag pattern and link information pattern may be used either separately or in combination. Deployment of wireless networks in the future will be denser such that operators possibly shall exchange more accurate information so as to achieve the object of better coordination; thus, in the embodiments of the present disclosure, the above two kinds of pattern signals are used in combination, that is, the flag pattern may be used as a preamble flag signal of the inter-operator coordination signal, for notifying start of the inter-operator coordination signal, and may also carry some simple link information, and the link information pattern may appear after the flag pattern and before a data stream, for carrying more complicated link information. The device at transmitting side may transmit the data stream immediately after finishing the broadcasting of the link information pattern.

As stated above, in view of continuation of standards and compatibility of apparatuses, the inter-operator coordination signal as the energy pattern signal eliminates difficulties in reception and demodulation for signal detection, so as to effectively realize information interaction between different operators on an unlicensed frequency band. In addition, it should be noted that a time domain length and a frequency domain width of the inter-operator coordination signal may be set according to specific circumstances and that a specific pattern used by the inter-operator coordination signal may be set according to the development trend of wireless networks in the future and the actual conditions of the respective operators; the present disclosure will not make any limitation hereto.

It should be noted that in the descriptions of the present disclosure, preferably, the wireless communication system is a LTA system; however, the present disclosure is not limited hereto, but may also be applied to a wireless communication system such as a Device to Device (D2D) communication system, a LTE-WiFi interconnect system and so on. In other words, the energy pattern manner of the present invention may be realized in any system where signals are limited signals on time-frequency domain.

In addition, it should be noted that in the LAA system, apparatuses of respective operators generally use a same OFDM symbol, so there generally does not exist a problem of making inter-operator coordination signals of the apparatuses of respective operators unified. However, in case of application to other communication systems than the LAA system, such as the LTE-WiFi interconnect system, for example assuming that the OFDM symbol used for the LTE system has a bandwidth of 15 KHz and a duration of 72 microseconds and that the OFDM symbol used for the WiFi system has a bandwidth of 312.5 kHz and a duration of 4 microseconds, if apparatuses of the two systems desire to transmit inter-operator coordination signals similar to each other, the apparatus of the LTE system may transmit 20 subcarriers as a group and the apparatus of the WiFi system may have a signal transmission duration of 18 symbol lengths, so as to realize unification between the signals. It should be understood that, the signal bandwidth and duration given herein aim only to facilitate descriptions of the given examples but do not serve as limitations; in terms of energy detection, detectable bandwidth and duration possibly do not have such strict limitations.

That is, preferably, the coordinating unit 104 may be further configured to realize unification with the inter-operator coordination signal of an apparatus of another operator by adjusting number of sub-carriers and/or signal transmission duration of the inter-operator coordination signal. Furthermore, preferably, the coordinating unit 104 may be further configured to adjust the number of sub-carriers and/or signal transmission duration of the inter-operator coordination signal according to a lease common multiple or a greatest common divisor of the number of sub-carriers and or signal transmission duration of the inter-operator coordination signal.

In addition, it should be noted that, the function units in the device 100 described above with reference to FIG. 1 may be either separate physical entities or logic entities, or different function units may also be realized by a same physical entity (e.g., a Central Processing Unit (CPU), a Large-Scale Integrated Circuit (ASIC), etc.). In addition, the device 100 may either be positioned in the device at transmitting side or be the device at transmitting side itself; in a case where the device 100 is the device at transmitting side itself, the device 100 may further comprise a communication unit such as a transceiver, for realizing signal transmission between the device 100 and another apparatus.

Figure 5:
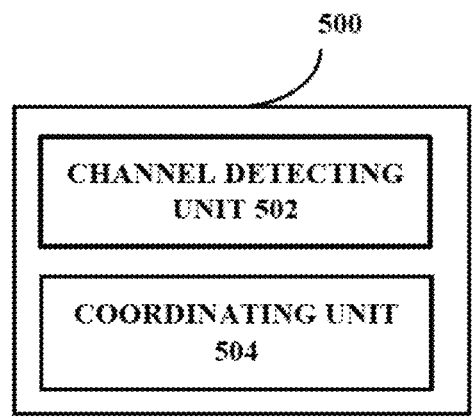
FIG. 5 is a block diagram showing a function configuration example of a device at receiving side in a wireless communication system according to an embodiment of the present disclosure.

Next, a function configuration example of a device at receiving side will be described with reference to FIG. 5. FIG. 5 is a block diagram showing a function configuration example of a device at receiving side in a wireless communication system according to an embodiment of the present disclosure. Preferably, the wireless communication system is a LTA system.

As shown in FIG. 5, the device 500 according to the embodiment may comprise a channel detecting unit 502 and a coordinating unit 504.

The channel detecting unit 502 may be configured to detect whether a receiving side channel on an unlicensed frequency band is idle, so as to ensure that the inter-operator coordination signal broadcast by the transmitting side can be correctly received. For the specific channel detection manner, reference may be made to the foregoing corresponding descriptions, and no repeated descriptions will be made herein.

Preferably, if the channel detecting unit 502 detects that the receiving side channel is idle, the receiving side can correctly receive the inter-operator coordination signal broadcast by the transmitting side, and if it is detected that the receiving side channel is busy at this time such that the signal cannot be received, the transmitting side may be notified by for example a licensed frequency band so that the transmitting side stops broadcasting the inter-operator coordination signal. At this time, the coordinating unit 504 at transmitting side may cause, in a case where a notification indicating that the receiving side channel is busy is received from the receiving side, the transmitting side to stop broadcasting the inter-operator coordination signal.

The coordinating unit 504 may be configured to cause, in a case where the receiving side channel is idle, the receiving side to broadcast a shortened inter-operator coordination signal synchronously with an inter-operator coordination signal from a transmitting side, at a predetermined time after the inter-operator coordination signal broadcast by the transmitting side is received, so as to realize information interaction between apparatuses of different operators.

Specifically, after receiving the inter-operator coordination signal broadcast by the transmitting side, the receiving side can know that the transmitting side has successfully performed LBT and obtained a channel, such that the coordinating unit 504 can cause the receiving side to wait for a small delay after receiving a small segment of the inter-operator coordination signal (for example, a segment of the preamble flag pattern) and then start broadcasting a shortened inter-operator coordination signal synchronously. Herein, waiting for a small delay is used to confirm that the transmitting side has broadcast the inter-operator coordination signal, and the delay can be set in advance according to the actual conditions. It should be noted that, the so-called "shortened inter-operator coordination signal" herein refers to that the inter-operator coordination signal broadcast by the receiving side is completely synchronous with the inter-operator coordination signal broadcast by the transmitting side, except for that the inter-operator coordination signal broadcast by the receiving side starts later than the inter-operator coordination signal broadcast by the transmitting side such that as compared with the inter-operator coordination signal broadcast by the transmitting side, a duration of the inter-operator coordination signal broadcast by the receiving side is shorter.

Figure 6:
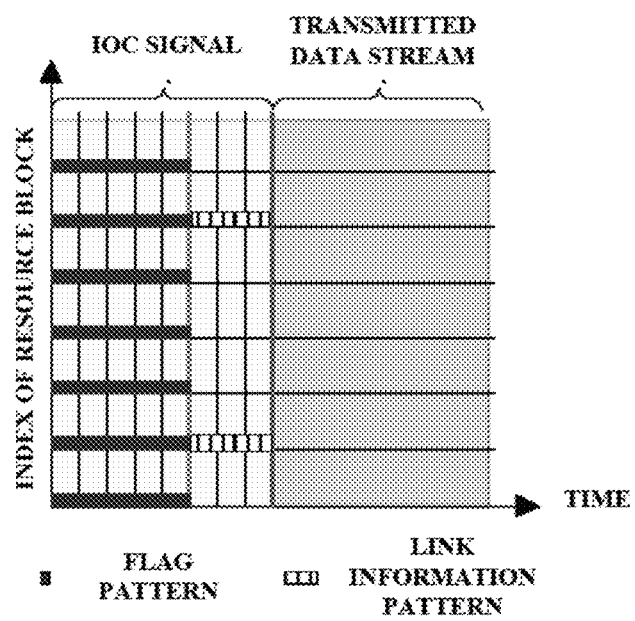
FIG. 6 is a schematic view showing an exemplary form of broadcasting an inter-operator coordination signal by a transmitting side according to an embodiment of the present disclosure.
Figure 7:
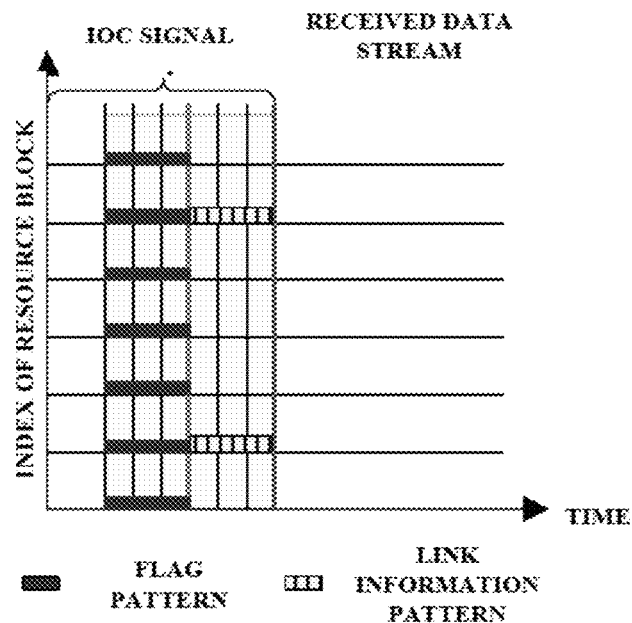
FIG. 7 is a schematic view showing an exemplary form of broadcasting an inter-operator coordination signal by a receiving side according to an embodiment of the present disclosure.

FIG. 6 and FIG. 7 illustrate exemplary forms of broadcasting the inter-operator coordination signal by the transmitting side and broadcasting the inter-operator coordination signal by the receiving side, respectively. As shown in FIG. 6 and FIG. 7, gray shadowed portions represent a preamble flag pattern of the inter-operator coordination signal, and vertical-line shadowed portions represent a link information pattern of the inter-operator coordination signal; moreover, after finishing of the inter-operator coordination signal, the transmitting side starts transmitting a data stream, and the receiving side starts receiving the data stream. As can be seen, the inter-operator coordination signal broadcast by the receiving side is completely synchronous with the inter-operator coordination signal broadcast by the transmitting side, except for that a start time of the inter-operator coordination signal broadcast by the receiving side is slightly later such that a length of the inter-operator coordination signal broadcast by the receiving side is shorter.

Preferably, according to the actual conditions, the above operation may also be adjusted. For example, to ensure that the receiving side can timely receive data, the coordinating unit 504 may cause the receiving side to finish broadcasting the shortened inter-operator coordination signal in advance, i.e., earlier than finishing of broadcasting of the inter-operator coordination signal by the transmitting side, so as to get prepared for receiving the data stream.

As stated above, since the inter-operator coordination signal is an energy pattern signal, if the transmitting side and the receiving side broadcast the inter-operator coordination signal simultaneously, overlaps of energy on corresponding positions of the inter-operator coordination signal will be caused, so as to increase a coverage range and intensity of the inter-operator coordination signal, without causing any overlap error and thus without interfering to reception of the inter-operator coordination signal.

As could be understood, in the case of broadcasting the inter-operator coordination signal by the transmitting side, another apparatus near the transmitting side may detect current transmission link information after receiving the inter-operator coordination signal; if it is determined that transmission by itself will not influence reception on the current link, a new transmission link may be established, thus making it possible to increase a channel utilization rate. Instead, for the traditional apparatus, by merely judging a channel state through energy detection, it cannot be judged whether a nearby link apparatus is receiving or is transmitting, but it can only be judged whether a channel is busy or idle; if the channel is busy, then keep mute and wait for idleness of the channel, which is a resource wastage for apparatuses around the transmitting side. On the other hand, in the case of broadcasting the inter-operator coordination signal by the receiving side, an apparatus near the receiving side detects current transmission link information upon receipt of the inter-operator coordination signal; if it is determined that transmission by itself will influence reception on the current link, it is possible to wait to perform transmission after the channel is idle or to select another channel to perform transmission, thus making it possible to improve transmission efficiency.

It should be noted that, the function units in the device 500 described above with reference to FIG. 5 may be either separate physical entities or logic entities, or different function units may also be realized by a same physical entity (e.g., a Central Processing Unit (CPU), a Large-Scale Integrated Circuit (ASIC), etc.). In addition, the device 500 may either be positioned in the device at transmitting side or be the device at transmitting side itself; in a case where the device 500 is the device at transmitting side itself, the device 500 may further comprise a communication unit such as a transceiver, for realizing signal transmission between the device 500 and another apparatus.

Figure 8:
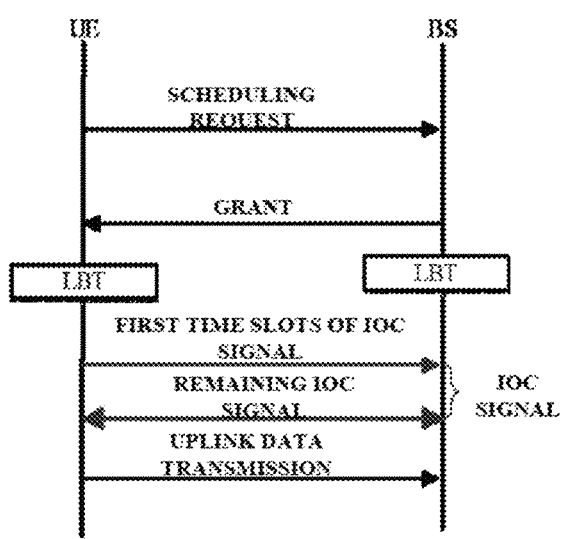
FIG. 8 is a schematic view showing an example of a signaling interaction process using an inter-operator coordination signal according to an embodiment of the present disclosure.

FIG. 8 gives an example of a signaling interaction process using air inter-operator coordination signal. FIG. 8 is a schematic view showing an example of a signaling interaction process using an inter-operator coordination signal according to air embodiment of the present disclosure.

It should be noted that, in the example as shown in FIG. 8, taking uplink transmission in a LTA system as an example, i.e., taking the transmitting side to be a User Equipment (UE) and the receiving side to be a Base Station (BS) as an example, a signaling interaction process between the user equipment and the base station in a case where an inter-operator coordination signal is used is given; however, this is only exemplary but not limitative. The present disclosure obviously can also be applied to scenarios such as downlink transmission, Device to Device (D2D) communication, LTE-WiFi interconnect and so on, and this also applies to subsequent descriptions.

As shown in FIG. 8, in the case of uplink transmission, the user equipment first sends an uplink scheduling request to the base station to obtain uplink transmission resources, and the base station can subsequently send an uplink scheduling giant (i.e., UL grant) to the user equipment according to a channel condition. After receiving the uplink scheduling grant, the user equipment performs LBT for the transmitting side channel to ensure that the transmitting side channel is idle and that transmission by the transmitting side will not produce any interference upon an existing link, and at the same time the base station also performs LBT for the receiving side channel to ensure that the receiving side channel is idle. In a case where it is detected the transmitting side channel is idle, the user equipment starts broadcasting the inter-operator coordination signal, and the base station also starts broadcasting the inter-operator coordination signal synchronously after receiving first time slots of the inter-operator coordination signal. After finishing of the broadcasting of the inter-operator coordination signal, the user equipment transmits a data stream to the base station.

As could be understood, the signaling interaction process as shown in FIG. 8 is only a simple exemplary interaction process given to describe the use of the inter-operator coordination signal, and those skilled in the art obviously can also perform modifications on this process according to the principle of the present disclosure. For example, as stated above, in a case where the base station detects that the receiving side channel is busy, the base station can notify the user equipment by a licensed frequency band so that the user equipment stops broadcasting the inter-operator coordination signal.

To make it easier to understand how the inter-operator coordination signal is applied to coordination between operators, examples of interaction scenarios and corresponding signaling interaction processes between operators in a case of applying the inter-operator coordination signal according to the present disclosure will be described with reference to FIG. 9 to FIG. 13 next.

Figure 9:
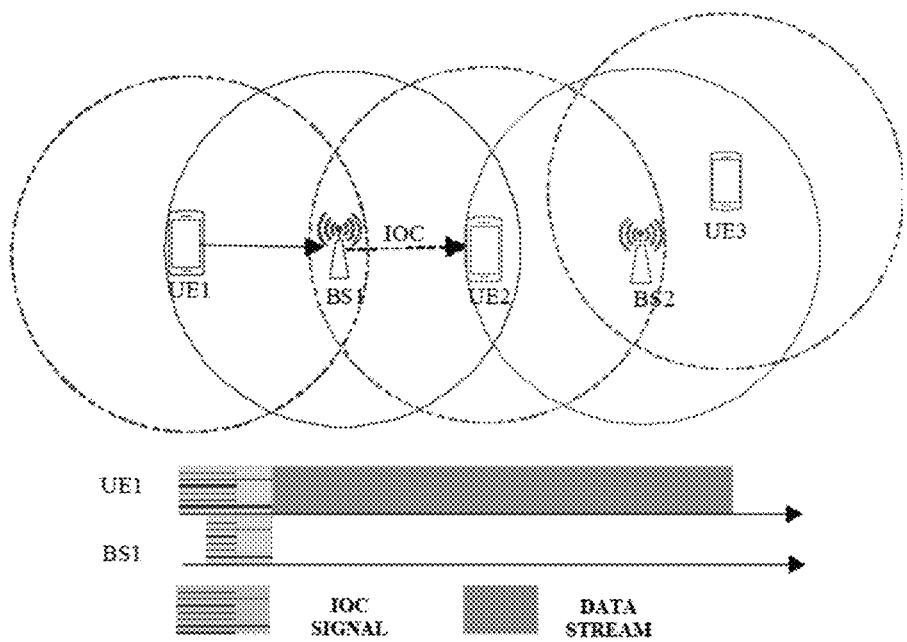
FIG. 9 is a schematic view showing an example of an interaction scenario between operators according to an embodiment of the present disclosure.

FIG. 9 is a schematic view showing an example of an interaction scenario between operators according to an embodiment of the present disclosure.

As shown in FIG. 9, a base station BS1 and a user equipment UE1 of an operator 1 as well as a base station BS2 and user equipments UE2 and UE3 of an operator 2 exist in the exemplary scenario, wherein circles represent power coverage ranges taking the respective equipments as centers, respectively. Herein, still taking uplink transmission as an example, the user equipment UE2 can hear the inter-operator coordination signal broadcast by the base station BS1 before receiving the data stream, such that the user equipment UE2 can report, to the base station BS2, link information of a link 1 between the base station BS1 and the user equipment UE1 which is obtained by parsing the inter-operator coordination signal, so as to perform reasonable scheduling by the base station BS2 to thereby avoid influence upon the link 1, so as to realize coordination between operators.

Figure 10:
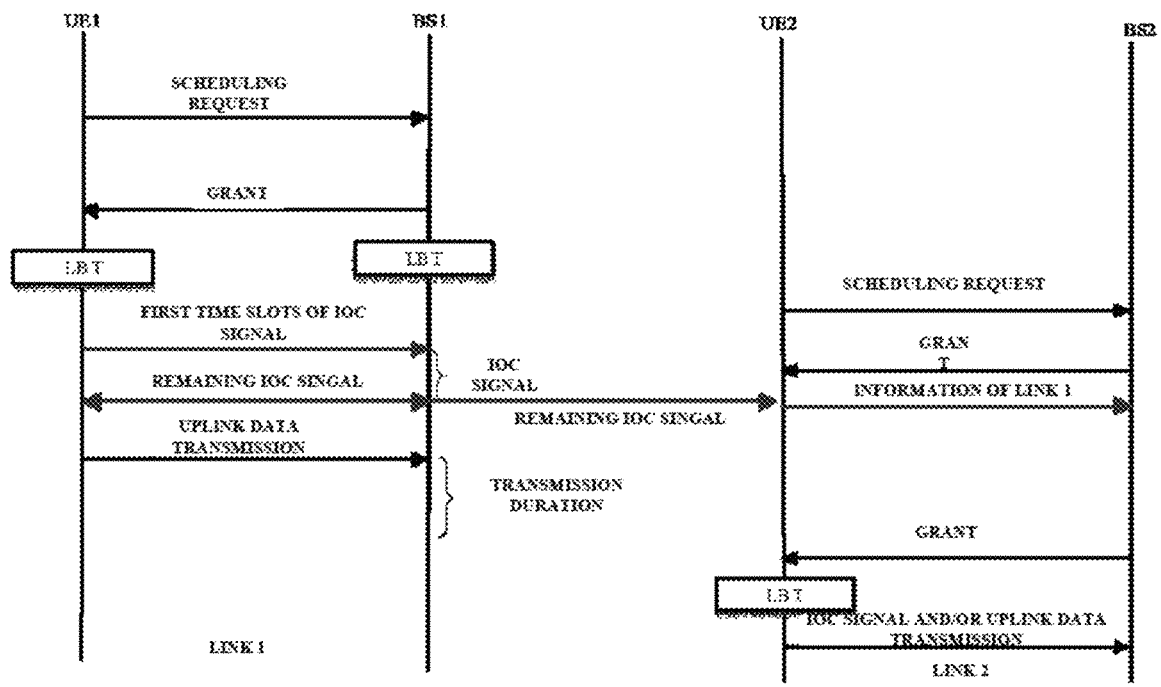
FIG. 10 is a schematic view showing an example of a signaling interaction process between operators in the example of the scenario as shown in FIG. 9.

FIG. 10 is a schematic view showing an example of a signaling interaction process between operators in the example of the scenario as shown in FIG. 9.

In the signaling interaction process as shown in FIG. 10, the signaling interaction process between the user equipment UE1 and the base station BS1 is identical to the signaling interaction process as described previously with reference to FIG. 8, and will not be repeatedly described herein. Herein, signaling related to interaction between operators will be mainly described in detail. As shown in FIG. 10, the user equipment UE2 of the operator 2 near the base station BS1 can parse the received inter-operator coordination signal broadcast by the base station BS1 to obtain the information of the link 1, and report the information of the link 1 to the base station BS2; if the base station BS2 judges, according to the link information, that transmission on the link 2 will influence the link 1, the base station BS2 may wait to schedule the user equipment UE2 (i.e., send uplink grant signaling) after finishing of transmission on the link 1. The signaling interaction process between the user equipment UE2 and the base station BS2 may be similar to the signaling interaction process using the inter-operator coordination signal as described above with reference to FIG. 8, or may also not use the inter-operator coordination signal but, according to the same way in the prior art, directly perform uplink data transmission after the user equipment UE2 detects that a channel on an unlicensed frequency band is idle.

Figure 11:
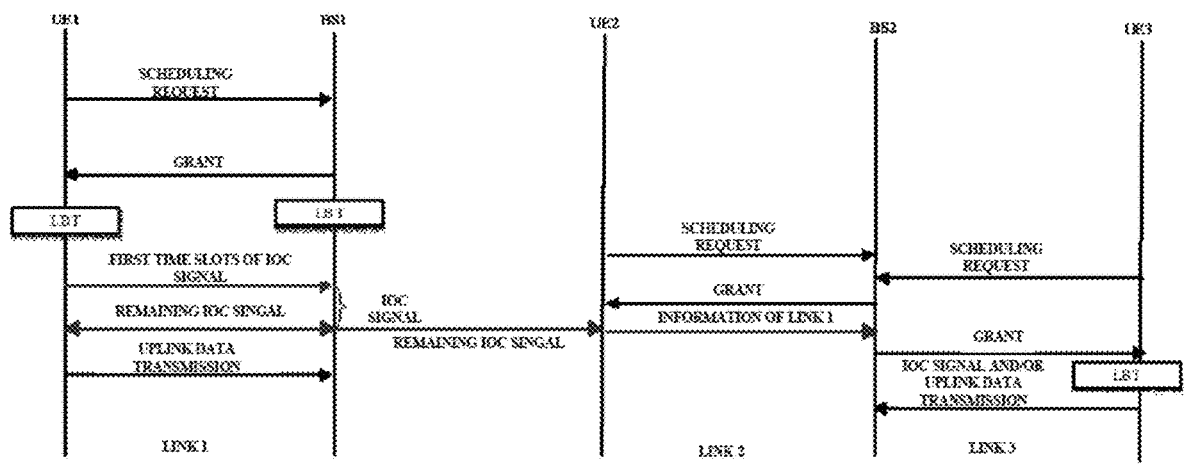
FIG. 11 is a schematic view showing another example of the signaling interaction process between operators in the example of the scenario as shown in FIG. 9.

Alternatively, in place of waiting to schedule the user equipment UE2 after finishing of the transmission on the link 1 according to the same way in the signaling interaction process as shown in FIG. 10, the base station BS2 may also select to schedule another user equipment which will not influence the link 1 at this time. For example, as shown in FIG. 9, the user equipment UE3 is far away from the base station BS1; thus, if the base station BS2 judges dial the transmission on the link 2 will influence the link 1, it may also schedule the user equipment UE3 to establish a link 3, and transmission on the link 3 will not influence the link 1. FIG. 11 illustrates a signaling interaction process in this case.

FIG. 11 is a schematic view showing another example of the signaling interaction process between operators in the example of the scenario as shown in FIG. 9.

As shown in FIG. 11, the signaling interaction process as shown in FIG. 11 is substantially similar to the process as shown in FIG. 10, except for a difference only in the following: after receiving the information of the link 1, the base station BS2 does not select to wait to schedule the user equipment UE2 after finishing of the transmission on the link 1, but schedules the user equipment UE3 to establish a link 3 to perform transmission, and transmission on the link 3 will not influence the link 1. The signaling interaction process between the user equipment UE3 and the base station BS2 may be similar to the signaling interaction process using the inter-operator coordination signal as described above with reference to FIG. 8, or may also not use the inter-operator coordination signal but, according to the same way in the prior art, directly perform uplink data transmission after the user equipment UE3 detects that a channel on an unlicensed frequency band is idle.

Figure 12:
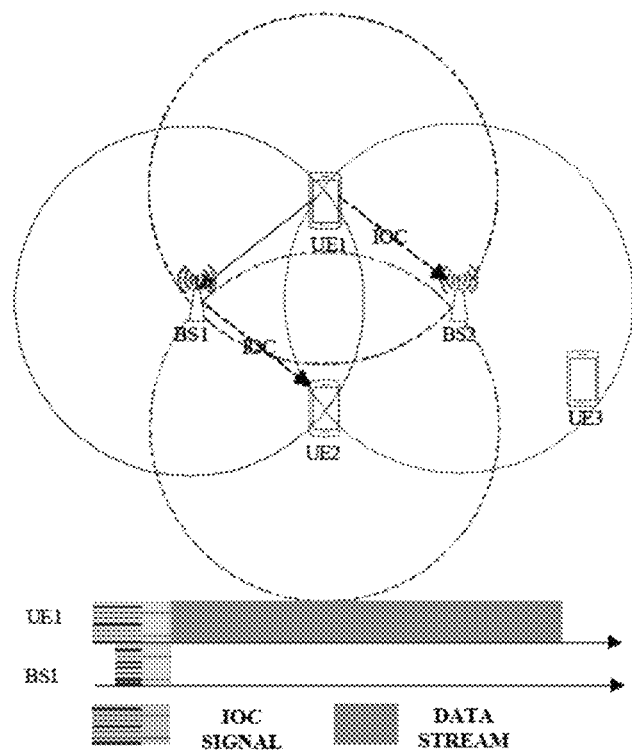
FIG. 12 is a schematic view showing another example of an interaction scenario between operators according to an embodiment of the present disclosure.

FIG. 12 is a schematic view showing another example of an interaction scenario between operators according to an embodiment of the present disclosure.

As shown in FIG. 12, a base station BS1 and a user equipment UE1 of an operator 1 as well as a base station BS2 and user equipments UE2 and UE3 of an operator 2 exist in the exemplary scenario, wherein circles represent power coverage ranges taking the respective equipments as centers, respectively. Herein, still taking uplink transmission as an example, the base station BS2 can hear the inter-operator coordination signal broadcast by the user equipment UE1 before receiving the data stream, and the user equipment UE2 can heat the inter-operator coordination signal broadcast by the base station BS1 before receiving the data stream; thus, it can be ensured that after the establishment of the link 1 between the base station BS1 and the user equipment UE1, the user equipment UE2 will not send an uplink scheduling request to the base station BS2 and thereby will not influence the transmission on the link 1. The base station BS2 may re-schedule the user equipment UE2 at proper time according to the inter-operator coordination signal broadcast by the user equipment UE1 to avoid influence upon the link 1, so as to realize coordination between operators.

Figure 13:
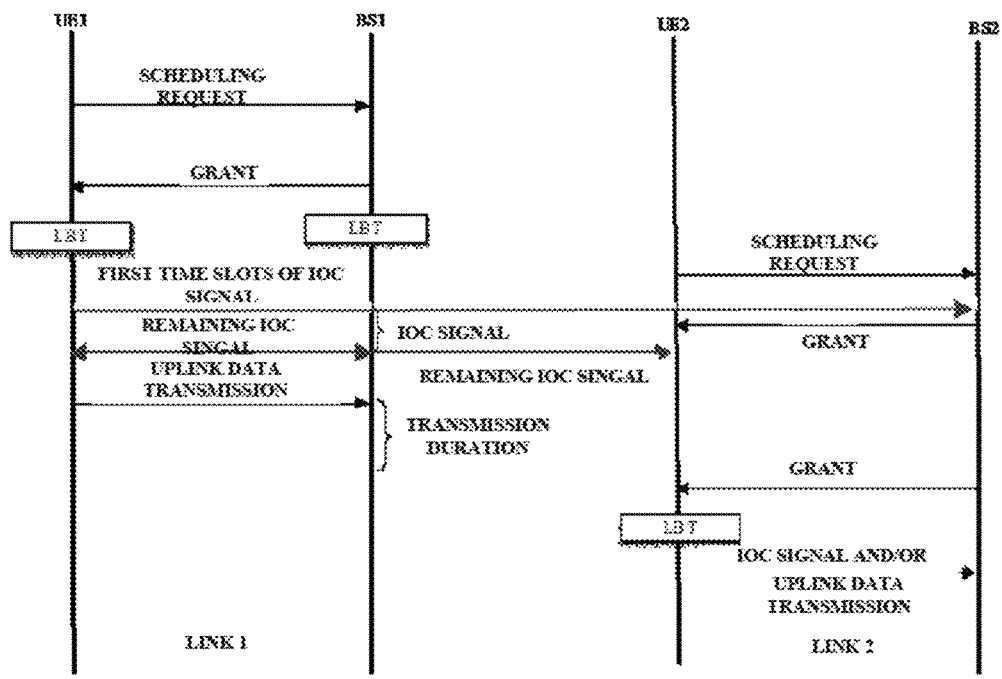
FIG. 13 is a schematic view showing an example of a signaling interaction process between operators in the example of the scenario as shown in FIG. 12.

FIG. 13 is a schematic view showing an example of a signaling interaction process between operators in the example of the scenario as shown in FIG. 12.

In the signaling interaction process as shown in FIG. 13, the signaling interaction process between the user equipment UE1 and the base station BS1 is identical to the signaling interaction process as described previously with reference to FIG. 8, and will not be repeatedly described herein. Herein, signaling related to interaction between operators will be mainly described in detail. As shown in FIG. 13, the base station BS2 can hear the inter-operator coordination signal broadcast by the user equipment UE1; thus differing from the signaling interaction process as shown in FIG. 11, the base station BS2 can know the condition of the link 1 by merely paring the inter-operator coordination signal, without needing to receive a link information report of the user equipment UE2, such that the base Station BS2 can schedule the user equipment UE2 after finishing of the transmission on the link 1, so as to avoid conflictions. The signaling interaction process between the user equipment UE2 and the base station BS2 may be similar to the signaling interaction process using the inter-operator coordination signal as described above with reference to FIG. 8, or may also not use the inter-operator coordination signal but, according to the same way in the prior art, directly perform uplink data transmission after the user equipment UE2 detects that a channel on an unlicensed frequency band is idle. Alternatively, in the exemplary scenario as shown in FIG. 12, it is also possible that like the signaling interaction process as described above with reference to FIG. 11, in place of the base station BS2 waiting to schedule the user equipment UE2 after finishing of the transmission on the link 1 in the signaling interaction process as shown in FIG. 13, the base station BS2 may also select to schedule the user equipment which will not influence the link 1 at this time to establish a link so as to perform transmission. The specific signaling interaction process is similar to that as shown in FIG. 11, and will not be repeatedly described herein.

According to the foregoing descriptions of the signaling interaction processes, preferably, the coordinating unit 104 of the device 100 at transmitting side may control, in a case of uplink transmission, the transmitting side to send an uplink scheduling request to a base station according to the inter-operator coordination signal broadcast by an apparatus of another operator, and may also report link information determined according to the inter-operator coordination signal broadcast by an apparatus of another operator to a base station, to perform uplink scheduling by the base station. On the other hand, the coordinating unit 501 of the device 500 at receiving side may, in a case of uplink transmission, perform uplink scheduling according to the inter-operator coordination signal broadcast by an apparatus of another operator or the link information reported by the transmitting side. Accordingly, it is made possible to easily realize coordination between the operators utilizing the inter-operator coordination signal, so as to avoid conflictions of data transmission, thus improving the overall performance of the system.

It should be noted that, the interaction scenarios and signaling interaction processes between operators which are given above are only exemplary but not limitative, and those skilled in the art obviously can perform modifications on the above processes according to the principle of the present disclosure for application to other scenarios (e.g., downlink transmissions, D2D transmission, etc.), as long as the apparatuses of respective operators can perform information interaction utilizing the inter-operator coordination signal so as to achieve the object of avoiding conflictions. For example, in a case of downlink transmission, the base station as the transmitting side does not necessarily send a scheduling request to obtain a permission in order to perform the subsequent operations such as the LBT, the broadcasting of the inter-operator coordination signal and so on; moreover, in a case where it is judged according to the inter-operator coordination signal broadcast by an apparatus of another operator that transmission on the current link transmission will influence an existing link, the base station may wait to perform data transmission to the user equipment after finishing of transmission on the existing link, or may establish a link with another user equipment which will not influence the existing link so as to perform transmission. All the signaling interaction processes in other scenarios are proper modifications that can be realized by those skilled in the art according to the existing knowledge and the principle of the present disclosure, and will not be repeatedly listed herein.

Figure 14:
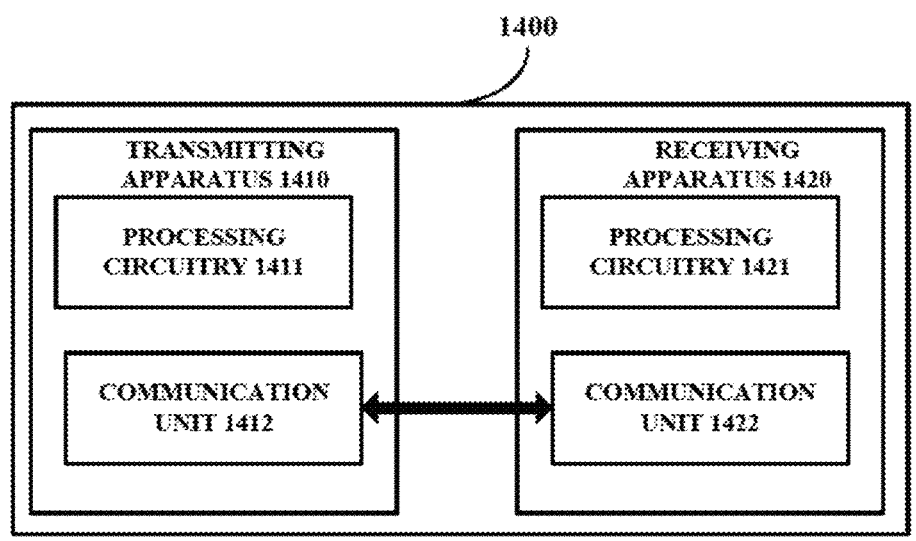
FIG. 14 is a block diagram showing an exemplary configuration of a wireless communication system according to an embodiment of the present disclosure.

FIG. 14 is a block diagram showing an exemplary configuration of a wireless communication system according to an embodiment of the present disclosure.

As shown in FIG. 14, the wireless communication system 1400 according to the embodiment may comprise a transmitting apparatus 1410 and a receiving apparatus 1420. Preferably, the wireless communication system 1400 may be a LTA system.

The transmitting apparatus 1410 may comprise a processing circuitry 1411 and communication unit 1412. The processing circuitry 1411 may be configured to perform the operations of the channel detecting unit 102 and the coordinating unit 104 as described above with reference to FIG. 1. i.e., detect whether a transmitting side channel on an unlicensed frequency band is idle, and in a case where the transmitting side channel is idle, broadcast an inter-operator coordination signal before transmitting a data stream, so as to realize information interaction between apparatuses of different operators. The communication unit 1412 may be configured to perform communication between the transmitting device 1410 and another apparatus.

The receiving apparatus 1420 may comprise a processing circuitry 1421 and communication unit 1422. The processing circuitry 1421 may be configured to perform the operations of the channel detecting unit 502 and the coordinating unit 504 as described above with reference to FIG. 5, i.e., detect whether a receiving side channel on the unlicensed frequency band is idle, and in a case where the receiving side channel is idle, broadcast a shortened inter-operator coordination signal synchronously with an inter-operator coordination signal from the transmitting apparatus, at a predetermined time alter the inter-operator coordination signal broadcast by the transmitting apparatus is received. The communication unit 1422 may be configured to perform communication between the transmitting device 1420 and another apparatus.

It should be noted that, the specific implementations of the processing circuitries 1411 and 1421 herein may include a Central Processing unit (CPU), a Digital Signal Processor (DSP), a Large-Scale Integrated Circuit (ASIC), a Field-Programmable Gate Array (FPGA) and the like, and the specific implementations of the communication units 1421 and 1422 may include a transceiver, an antenna and the like.

It should be noted that, although the devices at transmitting side and receiving side in the wireless communication system and the configuration example of the wireless communication system have been described above, these are only exemplary but not limitative, and those skilled in the art can perform modifications on the above configuration according to the principle of the present disclosure, for example, perform additions, deletions, combinations, sub-combinations, alterations and the like on the respective function units; moreover, such modifications shall be regarded as falling within the scope of the present disclosure.

In correspondence to the above device embodiments, corresponding method embodiments are also disclosed. Next, the method embodiments of the present disclosure will be described with reference to FIG. 15 and FIG. 16.

Figure 15:
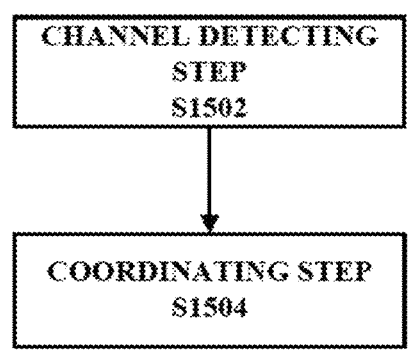
FIG. 15 is a flowchart of a process example of a method at transmitting side in a wireless communication system according to an embodiment of the present disclosure.

FIG. 15 is a flowchart of a process example of a method at transmitting side in a wireless communication system according to an embodiment of the present disclosure.

As shown in FIG. 15, first, in a channel detecting step S1502, it is detected whether a transmitting side channel on an unlicensed frequency band is idle. Then, in a coordinating step S1504, in a case where the transmitting side channel is idle, the transmitting side is caused to broadcast an inter-operator coordination signal before transmitting a data stream, so as to realize information interaction between apparatuses of different operators. The inter-operator coordination signal herein is an energy pattern signal on a time domain-frequency domain plane utilizing presence or absence of energy on a specified frequency band to realize the information interaction between the apparatuses of different operators. For detailed descriptions and use of the inter-operator coordination signal, reference may be made to the foregoing corresponding descriptions in the above device embodiments, and no repeated descriptions will be made herein.

Preferably, the wireless communication system is a LTA system.

Preferably, in the coordinating step S1504, it is also possible to cause, in a case where a notification indicating that a receiving side channel is busy is received from a receiving side, the transmitting side to stop broadcasting the inter-operator coordination signal.

Preferably, in the coordinating step S1504, it is also possible to control, in a case of uplink transmission, the transmitting side to send an uplink scheduling request to a base station according to the inter-operator coordination signal broadcast by an apparatus of another operator.

Preferably, in the coordinating step S1504, it is also possible to report, in a case of uplink transmission, link information determined according to the inter-operator coordination signal broadcast by an apparatus of another operator to a base station, to perform uplink scheduling by the base station.

Preferably, in the coordinating step S1504, it is possible to realize unification with the inter-operator coordination signal of an apparatus of another operator by adjusting number of sub-carriers and or signal transmission duration of the inter-operator coordination signal.

In addition, preferably in the coordinating step S1504, it is possible to adjust the number of sub-carriers and/or signal transmission duration of the inter-operator coordination signal according to a lease common multiple or a greatest common divisor of the number of sub-carriers and or signal transmission duration of the inter-operator coordination signal.

Figure 16:
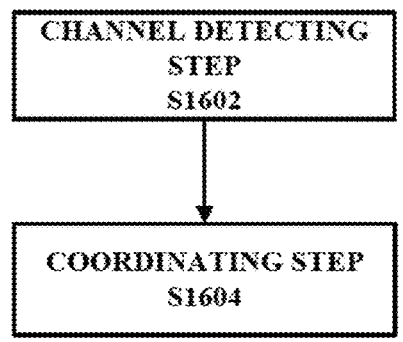
FIG. 16 is a flowchart of a process example of a method at receiving side in a wireless communication system according to an embodiment of the present disclosure.

FIG. 16 is a flowchart of a process example of a method at receiving side in a wireless communication system according to an embodiment of the present disclosure.

As shown in FIG. 16, first, in a channel detecting step S1602, it is detected whether a receiving side channel on an unlicensed frequency band is idle. Then, in a coordinating step S1604, in a case where the receiving side channel is idle, the receiving side is caused to broadcast a shortened inter-operator coordination signal synchronously with an inter-operator coordination signal from transmitting side, at a predetermined time after the inter-operator coordination signal broadcast by the transmitting side is received, so as to realize information interaction between apparatuses of different operators.

Preferably, in the channel detecting step S1602, it is also possible to notify, in a case where it is detected the receiving side channel is busy, the transmitting side so that the transmitting side stops broadcasting the inter-operator coordination signal.

Preferably, in the coordinating step S1604, it is possible to cause the receiving side to, after receiving a part of the flag pattern of the inter-operator coordination signal broadcast by the transmitting side to confirm that the transmitting side has broadcast the inter-operator coordination signal, broadcast the shortened inter-operator coordination signal synchronously with the inter-operator coordination signal from the transmitting side.

Preferably, in the coordinating step S1604, it is possible to cause the receiving side to finish broadcasting the shortened inter-operator coordination signal before the transmitting side has finished broadcasting the inter-operator coordination signal.

Preferably, in the coordinating step S1604, it is possible to perform, in a case of uplink transmission, uplink scheduling according to the inter-operator coordination signal broadcast by an apparatus of another operator.

Preferably, in the coordinating step S1601, it is possible to perform, in a case of uplink transmission, uplink scheduling based on link information reported by the transmitting side and determined according to the inter-operator coordination signal broadcast by an apparatus of another operator.

It should be understood that, the method embodiments described herein correspond to the above device embodiments; thus, for contents not described in detail in the method embodiments, reference may be made to the corresponding descriptions in the above device embodiments, and no repeated descriptions will be made herein.

It should be noted that, although the process examples of the methods in the wireless communication systems according to the embodiments of the present disclosure have been described above, these are only exemplary but not limitative, and those skilled in the art can perform modifications on the above embodiments according to the principle of the present disclosure, for example, perform additions, deletions or combinations and the like on the steps in the respective embodiments; moreover, all of such modifications fall within the scope of the present disclosure.

In addition, it should also be noted that, although it is described as an example herein that the technical solution of the present invention is applied to a LTA system, with the development of the communication technology in the future, the technical solution of the present invention may also be correspondingly expanded for application in any wireless communication system having a similar problem; that is, the technical solution of the present invention may be applicable to any system where signals are limited signals on time-frequency domain.

In addition, according to an embodiment of the present disclosure, there is further provided an electronic device, which may comprise a receiver and one or more processors, wherein the one or more processors may be configured to implement the methods or the functions of the corresponding units in the above wireless communication systems according to the present disclosure.

It should be understood that, machine-executable instructions in a storage medium and a program product according to the embodiment of the present disclosure may also be configured to perform the methods corresponding to the above device embodiments; thus, for contents not described in detail herein, reference may be made to the preceding corresponding descriptions, and no repeated descriptions will be made herein.

Correspondingly, a storage medium for carrying the program product including machine-executable instructions is also included in the disclosure of the present invention. The storage medium includes but is not limited to a floppy disc, an optical disc, a magnetic optical disc, a memory card, a memory stick and the like.

Figure 17:
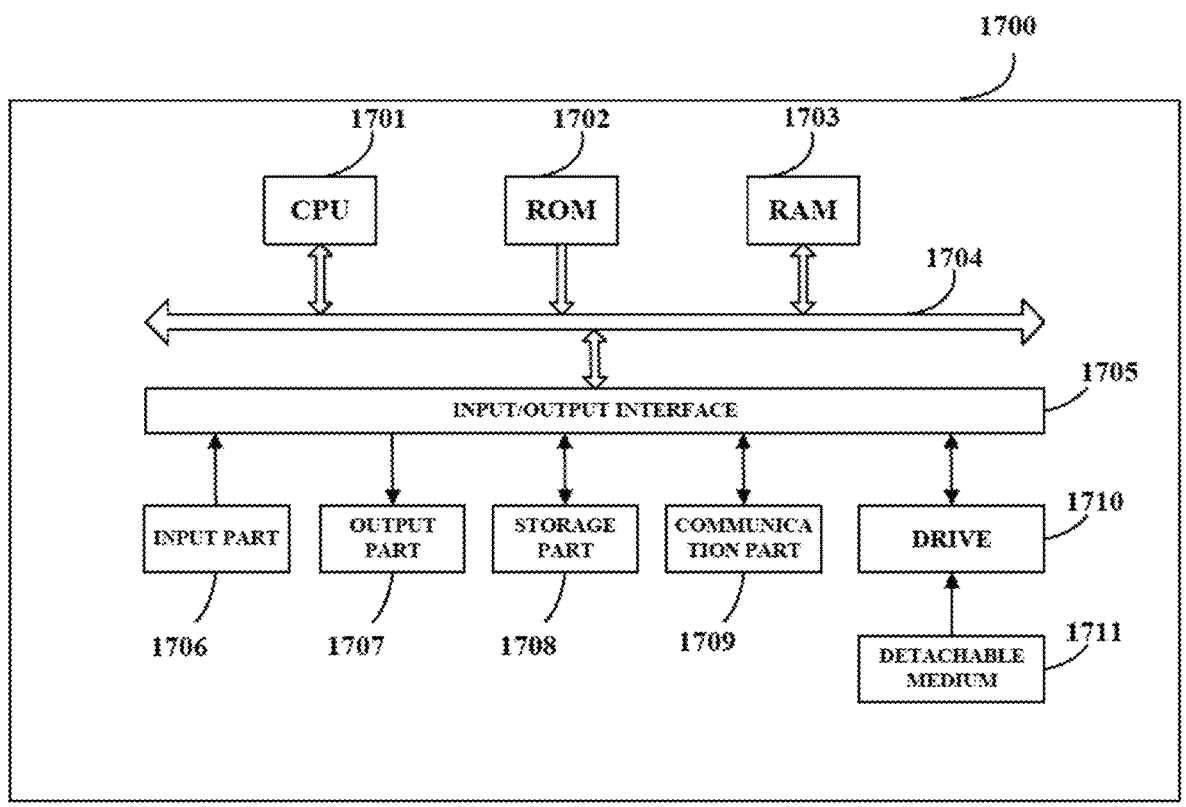
FIG. 17 is a block diagram showing an exemplary structure of a personal computer of an information processing apparatus usable in an embodiment of the present disclosure.

In addition, it should also be noted that, the foregoing series of processing and devices may also be implemented by software and or firmware. In the case of implementation by software and/or firmware, programs constituting the software are installed from a storage medium or a network to a computer having a special-purpose hardware structure, for example the universal personal computer 1700 as shown in FIG. 17. The computer, when installed with various programs, can implement various functions and the like. FIG. 17 is a block diagram showing an exemplary structure of a personal computer of an information processing apparatus usable in an embodiment of the present disclosure.

In FIG. 17, a central processing unit (CPU) 1701 performs various processing according to a program stored in a read-only memory (ROM) 1702 or a program loaded from a storage part 1708 to a random access memory (RAM) 1703. In the RAM 1703, data needed when the CPU 1701 performs various processing and the like is also stored according to requirements.

The CPU 1701, the ROM 1702 and the RAM 1703 are connected to each other via a bus 1704. An input/output interface 1705 is also connected to the bus 1704.

The following components are connected to the input output interface 17005; an input part 1706, including a keyboard, a mouse and the like; an output part 1707, including a display, such as a Cathode Ray Tube (CRT), a Liquid Crystal Display (LCD) and the like, as well as a speaker and the like; the storage part 1708, including a hard disc and the like; and a communication part 1709, including a network interface card such as an LAN card, a modem and the like. The communication part 1709 performs communication processing via a network such as the Internet.

According to requirements, a drive 1710 is also connected to the input/output interface 1705. A detachable medium 1711 such as a magnetic disc, an optical disc, a magnetic optical disc, a semiconductor memory and the like is installed on the drive 1710 according to requirements, such that a computer program read therefrom is installed in the storage part 1708 according to requirements.

In the case of implementing the foregoing series of processing by software, programs constituting the software are installed from a network such as the Internet or a storage medium such as the detachable medium 1711.

Those skilled in the art should understand that such a storage medium is not limited to the detachable medium 1711 in which a program is stored and which is distributed separately from the apparatus to provide the program to a user as shown in FIG. 17. Examples of the detachable medium 1711 include a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Or, the storage medium may be hard discs and the like included in the ROM 1702 and the storage part 1708, in which programs are stored and which are distributed concurrently with the apparatus including them to users.

Application examples according to the present disclosure will be described with reference to FIG. 18 to FIG. 21 below.

APPLICATION EXAMPLES ABOUT BASE STATION

First Application Example

Figure 18:
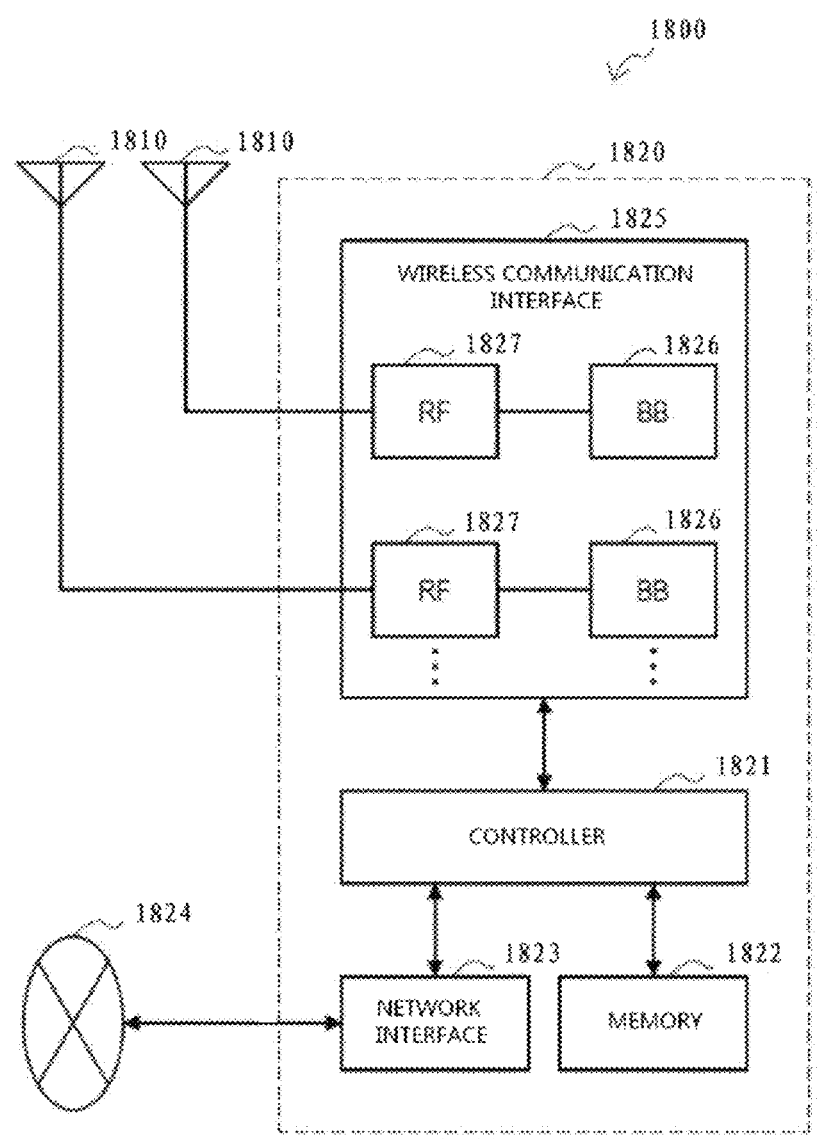
FIG. 18 is a block diagram showing a first example of a schematic configuration of an evolutional-node (eNB) to which the technology of the present disclosure can be applied.

FIG. 18 is a block diagram showing a first example of a schematic configuration of an eNB to which the technology of the present disclosure can be applied. An eNB 1800 comprises one or more antennas 1810 and a base station equipment 1820. The base station equipment 1820 and each antenna 1810 may lie connected with each other via an RF cable.

Each of the antennas 1810 comprises a single or more antenna elements (such as a plurality of antenna elements included in a Multi-Input Multi-Output (MIMO) antenna), and is used for the base station equipment 1820 to transmit and receive wireless signals. As shown in FIG. 18, the eNB 1800 may comprise a plurality of antennas 1810. For example, the plurality of antennas 1810 may be compatible with a plurality of frequency bands used by the eNB 1800. Although FIG. 18 shows an example in which the eNB 1800 comprises a plurality of antennas 1810, the eNB 1800 may also comprise a single antenna 1810.

The base station equipment 1820 comprises a controller 1821, a memory 1822, a network interface 1823 and a wireless communication interface 1825.

The controller 1821 may be for example a CPU or a DSP, and operates various functions of higher layers of the base station equipment 1820. For example, the controller 1821 generates data packets according to data in signals processed by the wireless communication interface 1825, and transfers the generated packets via the network interface 1823. The controller 1821 may bind data from a plurality of baseband processors to generate bound packets, and transfer the generated bound packets. The controller 1821 may have a logic function of performing the following control; the control for example is radio resource control, radio bearer control, mobility management, admission control and scheduling. The control may be performed in combination with a nearby eNB or core network node. The memory 1822 comprises an RAM and an ROM, and stores programs executed by the controller 1821 and various types of control data (such as a terminal list, transmission power data and scheduling data).

The network interface 1823 is a communication interface for connecting the base station equipment 1820 to a core network 1824. The controller 1821 may perform communication with the core network node or another eNB via the network interface 1823. In this case, the eNB 1800 and the core network node or another eNB may be connected with each other via a logic interface (such as S1 interface and X2 interface). The network interface 1823 may also be a wired communication interface, or a wireless communication interface for a wireless backhaul. If the network interface 1823 is a wired communication interface, then as compared with the frequency bands used by the wireless communication interface 1825, the network interface 1823 may use higher frequency bands for wireless communication.

The wireless communication interface 1825 supports any cellular communication scheme (such as Long Term Evolution (LTE) and LTE-Advanced), and provides wireless connection to a terminal located in a cell of the eNB 1800 via the antenna 1810. The wireless communication interface 1825 generally may comprise a Baseband (BB) processor 1826 and an RF circuit 1827. The BB processor 1826 may execute for example coding decoding, modulation/demodulation and multiplexing/demultiplexing, and execute various types of signal processing of Layers (for example L1, Medium Access Control (MAC), Radio link Control (RLC) and Packet Data Convergence Protocol (PDCP). In place of the controller 1821, the BB processor 1826 may have a part of all of the above logic function. The processor 1826 may be a memory which stores a communication control program, or be a module which comprises a processor configured to execute a program and a related circuit. By updating the program, the function of the BB processor 1826 can be changed. The module may be a card or a blade inserted into a slot of the base station equipment 1820. Alternatively, the module may also be a chip installed on a card or a blade. Meanwhile, the RF circuit 1827 may comprise for example a frequency mixer, a filter and an amplifier, and transfers and receives wireless signals via the antenna 1810.

As shown in FIG. 18, the wireless communication interface 1825 may comprise a plurality of BB processors 1826. For example, the plurality of BB processors 1826 may be compatible with a plurality of frequency band used by the eNB 1800. As shown in FIG. 18, the wireless communication interface 1825 may comprise a plurality of RF circuits 1827. For example, the plurality of RF circuits 1827 may be compatible with a plurality of antenna elements. Although FIG. 18 shows an example in which the wireless communication interface 1825 comprises a plurality of BB processors 1826 and a plurality of RF circuits 1827, the wireless communication interface 1825 may also comprise a single BB processor 1826 or a single RF circuit 1827.

Second Application Example

Figure 19:
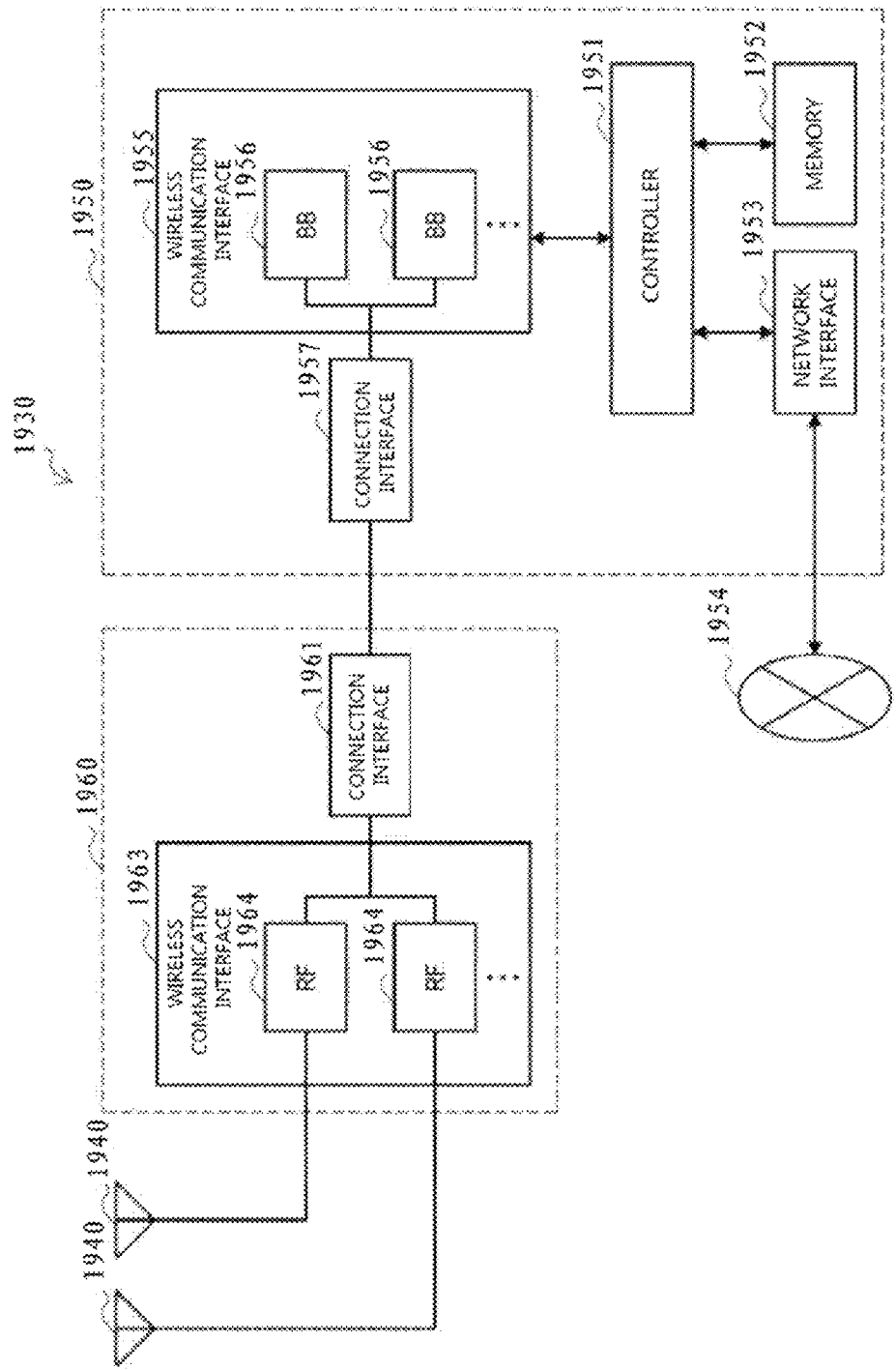
FIG. 19 is a block diagram showing a second example of a schematic configuration of an eNB to which the technology of the present disclosure can be applied.

FIG. 19 is a block diagram showing a second example of a schematic configuration of an eNB to which the technology of the present disclosure can be applied. An eNB 1930 comprises one or more antennas 1940, a base station equipment 1950 and an RRH 1960. The RRH 1960 and each antenna 1940 may be connected with each other via an RF cable. The base station equipment 1950 and the RRH 1960 may be connected with each other via a high-speed line such as an optical-fiber cable.

Each of the antennas 1940 comprises a single or more antenna elements (such as a plurality of antenna elements included in a Multi-Input Multi-Output (MIMO) antenna), and is used for the RRH 1960 to transmit and receive wireless signals. As shown in FIG. 19, the eNB 1930 may comprise a plurality of antennas 1940. For example, the plurality of antennas 1940 may be compatible with a plurality of frequency bands used by the eNB 1930. Although FIG. 19 shows an example in which the eNB 1930 comprises a plurality of antennas 1940, the eNB 1930 may also comprise a single antenna 1940.

The base station equipment 1950 comprises a controller 1951, a memory 1952, a network interface 1953, a wireless communication interface 1955 and a connection interface 1957. The controller 1951, the memory 1952 and the network interface 1953 are identical to the controller 1821, the memory 1822 and the network interface 1823 as described with reference to FIG. 18.

The wireless communication interface 1955 supports any cellular communication scheme (such as LTE and LTE-Advanced), and provides wireless communication to a terminal located in a sector corresponding to the RRH 1960 via the RRH 1960 and the antenna 1940. The wireless communication interface 1955 generally may comprise for example a BB processor 1956. Except for being connected to an RF circuit 1964 of the RRH 1960 via the connection interface 1957, the BB processor 1956 is identical to the BB processor 1826 as described with reference to FIG. 18. As shown in FIG. 19, the wireless communication interface 1955 may comprise a plurality of BB processors 1956. For example, the plurality of BB processors 1956 may be compatible with a plurality of frequency bands used by the eNB 1930. Although FIG. 19 shows an example in which the wireless communication interface 1955 comprises a plurality of BB processors 1956, the wireless communication interface 1955 may also comprise a single BB processor 1956.

The connection interface 1957 is an interface for connecting the base station equipment 1950 (the wireless communication interface 1955) to the RRH 1960. The connection interface 1957 may also be a communication module for communication in the above high-speed line for connecting the base station equipment 1950 (the wireless communication interface 1955) to the RRH 1960.

The RRH 1960 comprises a connection interface 1961 and a wireless communication interface 1963.

The connection interface 1961 is an interface for connecting the RRH 1960 (the wireless communication interface 1963) to the base station equipment 1950. The connection interface 1961 may also be a communication module for communication in the above high-speed line.

The wireless communication interface 1963 transfers and receives wireless signals via the antenna 1940. The wireless communication interface 1963 generally may comprise for example an RF circuit 1964. The RF circuit 1964 may comprise a frequency mixer, a filter and an amplifier, and transfers and receives wireless signals via the antenna 1940. As shown in FIG. 19, the wireless communication interface 1963 may comprise a plurality of RF circuits 1964. For example, the plurality of RF circuits 1964 may support a plurality of antenna elements. Although FIG. 19 shows an example in which the wireless communication interface 1963 comprises a plurality of RF circuits 1964, the wireless communication interface 1963 may also comprise a single RF circuit 1964.

In the eNB 1800 and eNB 1930 as shown in FIG. 18 and FIG. 19, the communication unit in the device 500 may be realized by the wireless communication interface 1825 and the wireless communication inter face 1955 and or the wireless communication interface 1963. At least a part of the functions of the channel detecting unit 502 and the coordinating unit 504 may also be realized by the controller 1821 and the controller 1951.

APPLICATION EXAMPLES ABOUT USER EQUIPMENT

First Application Example

Figure 20:
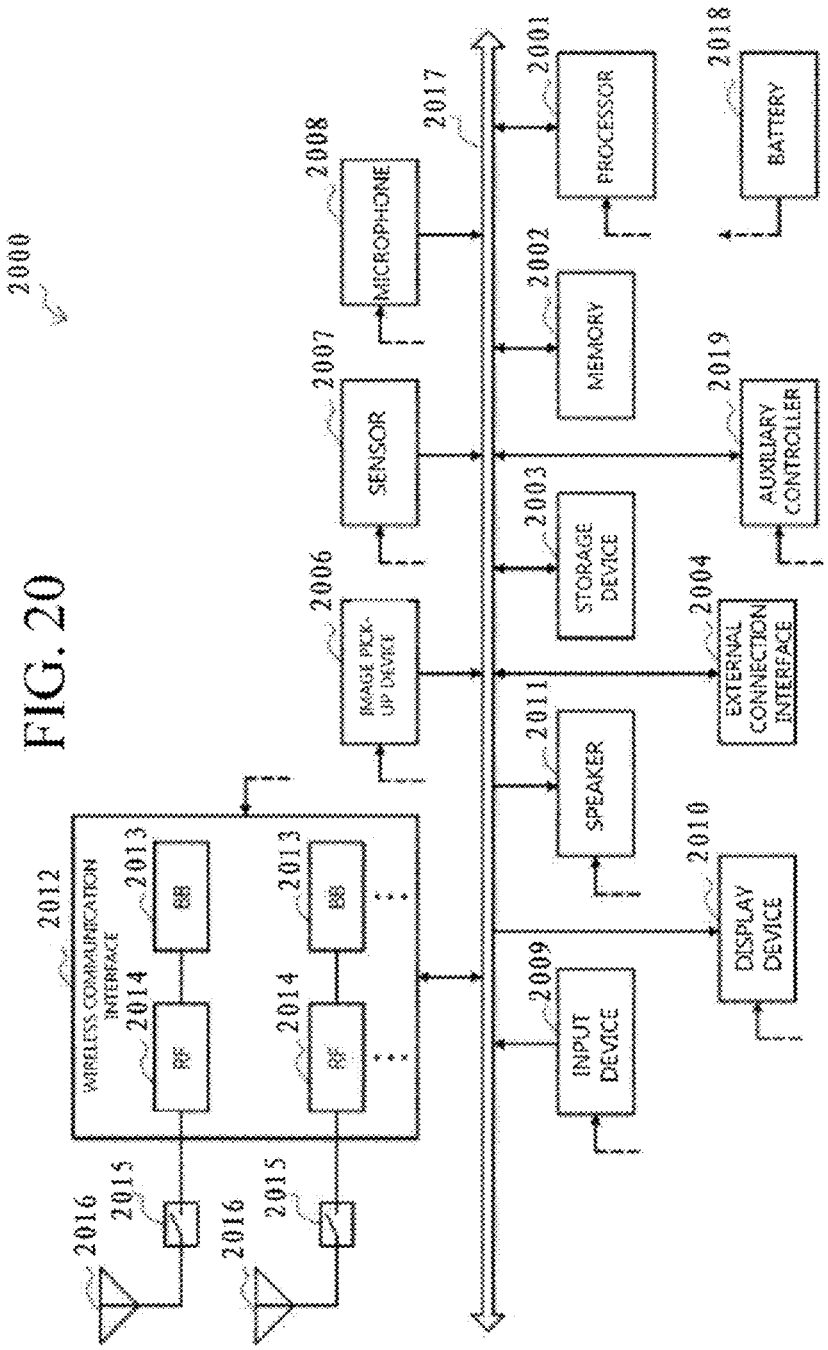
FIG. 20 is a block diagram showing an example of a schematic configuration of a smart telephone to which the technology of the present disclosure can be applied.

FIG. 20 is a block diagram showing an example of a schematic configuration of a smart telephone 2000 to which the technology of the present disclosure can be applied. The smart telephone 2000 comprises a processor 2001, a memory 2002, a storage device 2003, an external connection interface 2004, an image pickup device 2006, a sensor 2007, a microphone 2008, an input device 2009, a display device 2010, a speaker 2011, a wireless communication interface 2012. One or more antenna switches 2015, one or more antennas 2016, a bus 2017, a battery 2018 and an auxiliary controller 2019.

The processor 2001 may be for example a CPU or a System on a Chip (SoC), and controls functions of an application layer and an additional layer of the smart telephone 2000. The memory 2002 comprises an RAM and an ROM, and stores data and a program executed by the processor 2001. The storage device 2003 may comprise a storage medium, such as a semiconductor memory and a hard disc. The external connection interface 2004 is an interface for connecting an external device (such as a memory card and a Universal Serial Bus (USB) device) to an interface of the smart telephone 2000.

The image pick-up device 2006 comprises an image sensor (such as a Charge-Coupled Device (CCD) and a Complementary Metal Oxide Semiconductor (CMOS)), and generates a captured image. The sensor 2007 may comprise a group of sensors, such as a measuring sensor, a gyroscope sensor, a geomagnetic sensor and an acceleration sensor. The microphone 2008 converts sound input to the smart telephone 2000 into an audio signal. The input device 2009 comprises for example a touch sensor configured to detect a touch on a screen of the display device 2010, a keypad, a keyboard, a button or a switch, and receives an operation or information input by a user. The display device 2010 comprises a screen (such as a Liquid Crystal Display (LCD) and an Organic Light Emitting Diode (OLED) display), and displays an output image of the smart telephone 2000. The speaker 2011 converts the audio signal output from the smart telephone 2000 into sound.

The wireless communication interface 2012 supports any cellular communication scheme (such as LTE and LTE-Advanced), and performs wireless communication. The wireless communication interface 212 generally may comprise a BB processor 2013 and an RF circuit 2014. The BB processor 2013 may execute for example coding-decoding modulation/demodulation and multiplexing demultiplexing, and execute various types of signal processing for wireless communication. Meanwhile, the RF circuit 2014 may comprise for example a frequency mixer, a filter and an amplifier, and transfers and receives wireless signals via the antenna 2016. The wireless communication interface 2012 may be a chip module on which the BB processor 2013 and the RF circuit 2014 are integrated. As shown in FIG. 20, the wireless communication interface 2012 may comprise a plurality of BB processors 2013 and a plurality of RF circuits 2014. Although FIG. 20 shows an example in which the wireless communication interface 2012 comprises a plurality of BB processors 2013 and a plurality of RF circuits 2014, the wireless communication interface 2012 may also comprise a single BB processor 2013 or a single RF circuit 2014.

In addition, besides the cellular communication scheme, the wireless communication interface 2012 may support other types of wireless communication schemes, such as a short distance wireless communication scheme, a near field communication scheme and a wireless Local Area Network (LAN) scheme. In this case, the wireless communication interface 2012 may comprise a processor 2013 and an RF circuit 2014 for each wireless communication scheme.

Each of the antenna switches 2015 switches connection destinations of the antennas 2016 between a plurality of circuitries (e.g., circuitries for different wireless communication schemes) included in the wireless communication interface 2012.

Each of the antennas 2016 comprises a single or more antenna elements (such as a plurality of antenna elements included in an MIMO antenna), and is used for the wireless communication interface 2012 to transfer and receive wireless signals. As shown in FIG. 20, the small telephone 2000 may comprises a plurality of antennas 2016. Although FIG. 20 shows an example in which the smart telephone 2000 comprises a plurality of antennas, the smart telephone 2000 may also comprise a single antenna 2016.

In addition, the smart telephone 2000 may comprise an antenna 2016 for each wireless communication scheme. In this case, the antenna switches 2015 may be omitted in the configuration of the smart telephone 2000.

The bus 2017 connects the processor 2001, the memory 2002, the storage device 2003, the external connection interface 2004, the image pickup device 2006, the sensor 2007, the microphone 2008, the input device 2009, the display device 2010, the speaker 2011, the wireless communication interface 2012 and the auxiliary controller 2019 with each other. The battery 2018 supplies power to the respective blocks of the smart telephone 2000 as shown in FIG. 20 via feeder lines which are partially shown as dotted lines in the figure. The auxiliary controller 2019 for example operates a least necessary function of the small telephone 2000 in a sleep mode.

In the smart telephone 2000 as shown in FIG. 20, the communication unit in the device 100 may be realized by the wireless communication interface 2012. At least a part of the functions of the channel detecting unit 102 and the coordinating unit 104 may also be realized by the processor 2001 or the auxiliary controller 2019.

Second Application Example

Figure 21:
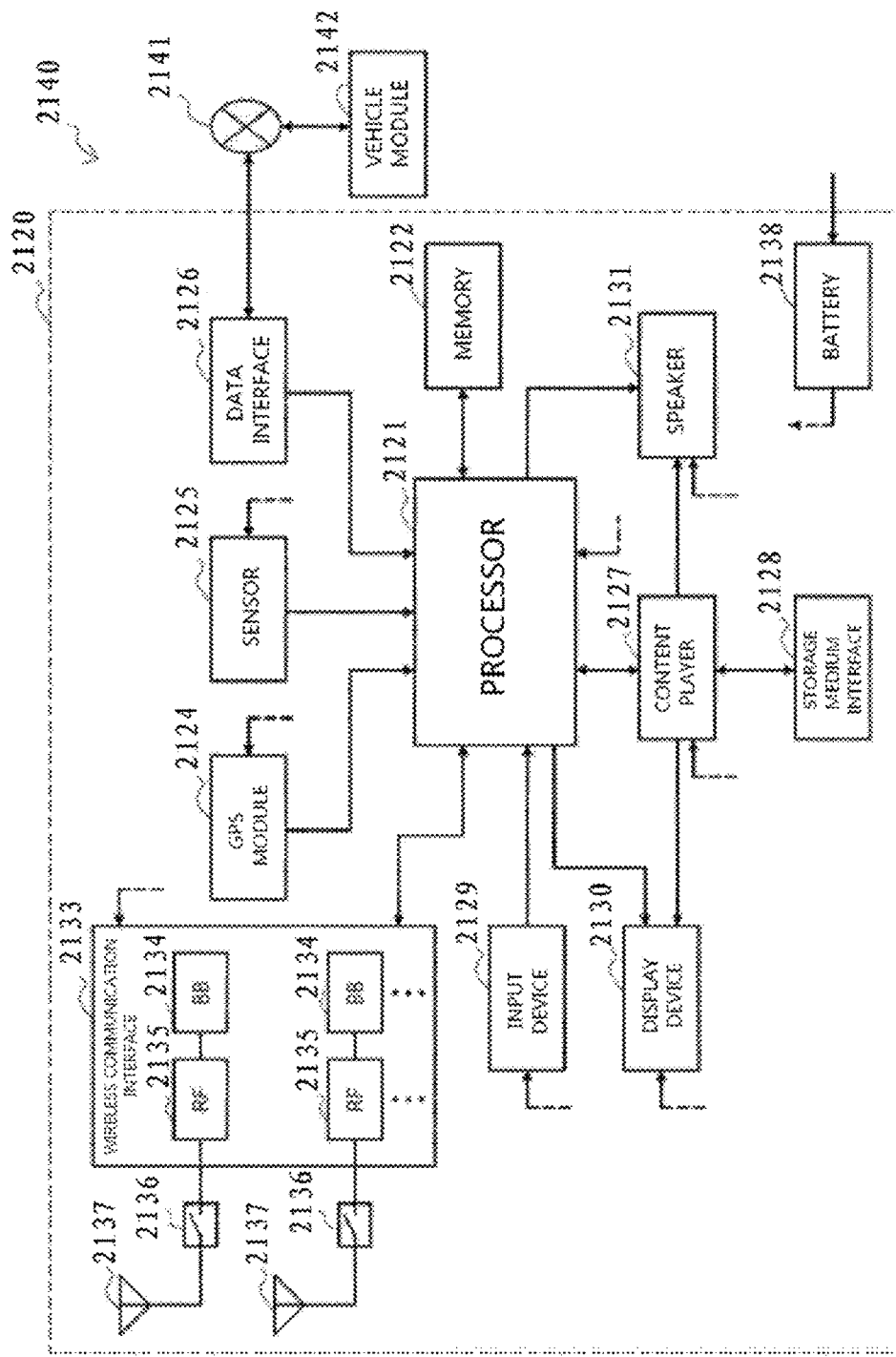
FIG. 21 is a block diagram showing an example of a schematic configuration of an automobile navigation equipment to which the technology of the present disclosure can be applied.

FIG. 21 is a block diagram showing an example of a schematic configuration of an automobile navigation equipment 2120 to which the technology of the present disclosure can be applied. The automobile navigation equipment 2120 comprises a processor 2121, a memory 2122, a Global Positioning System (GPS) module 2124, a sensor 2125, a data interface 2126, a content player 2127, a storage medium interface 2128, an input device 2129, a display device 2130, a speaker 2131, a wireless communication interface 2133, one or more antenna switches 2136, one or more antennas 2137 and a battery 2138.

The processor 2121 may be for example a CPU or a SoC, and controls a navigation function and an additional function of the automobile navigation equipment 2120. The memory 2122 comprises an RAM and an ROM, and stores data and a program executed by the processor 2121.

The GPS module 2124 measures a position (such as longitude, latitude and height) of the automobile navigation equipment 2120 using a GPS signal received from a GPS satellite. The sensor 2125 may comprise a group of sensors, such as a gyroscope sensor, a geomagnetic sensor and an air pressure sensor. The data interface 2126 is connected to for example an in-vehicle network 2141 via a terminal not shown, and acquires data (such as vehicle speed data) generated by a vehicle.

The content player 2127 reproduces content stored in a storage medium (such as a CD and a DVD), the storage medium is inserted into the storage medium interface 2128. The input device 2129 comprises for example a touch sensor configured to detect a touch on a screen of the display device 2130, a button or a switch, and receives an operation or information input by a user. The display device 2130 comprises a screen such as a LCD or an OLED display, and displays an image of the navigation function or the reproduced content. The speaker 2131 outputs sound of the navigation function or the reproduced content.

The wireless communication interface 2133 supports any cellular communication scheme (such as LTE and LTE-Advanced), and performs wireless communication. The wireless communication interface 2133 generally may comprise a BB processor 2134 and an RF circuit 2135. The BB processor 2134 may execute for example coding/decoding, modulation/demodulation and multiplexing/demultiplexing, and execute various types of signal processing for wireless communication. Meanwhile, the RF circuit 2135 may comprise for example a frequency mixer, a filter and an amplifier, and transfers and receives wireless signals via the antenna 2137. The wireless communication interface 2133 may also be a chip module on which the BB processor 2134 and the RF circuit 2135 are integrated. As shown in FIG. 21, the wireless communication interface 2133 may comprise a plurality of BB processors 2134 and a plurality of RF circuits 2135. Although FIG. 21 shows an example in which the wireless communication interface 2133 comprises a plurality of BB processors 2134 and a plurality of RF circuits 2135, the wireless communication interface 2133 may also comprise a single BB processor 2134 or a single RF circuit 2135.

In addition, besides the cellular communication scheme, the wireless communication interface 2133 may support other types of wireless communication schemes, such as a short distance wireless communication scheme, a near field communication scheme and a wireless LAN scheme. In this case, the wireless communication interface 2133 may comprise a processor 2134 and an RF circuit 2135 for each wireless communication scheme.

Each of the antenna switches 2136 switches connection destinations of the antennas 2137 between a plurality of circuitries (e.g., circuitries for different wireless communication schemes) included in the wireless communication interface 2133.

Each of the antennas 2137 comprises a single or more antenna elements (such as a plurality of antenna elements included in an MEMO antenna), and is used for the wireless communication interface 2133 to transfer and receive wireless signals. As shown in FIG. 21, the automobile navigation equipment 2120 may comprises a plurality of antennas 2137. Although FIG. 21 shows an example in which the automobile navigation equipment 2120 comprises a plurality of antennas 2137, the automobile navigation equipment 2120 may also comprise a single antenna 2137.

In addition, the automobile navigation equipment 2120 may comprise an antenna 2137 for each wireless communication scheme. In this case, the antenna switches 2036 may be omitted in the configuration of the automobile navigation equipment 2120.

The battery 2138 supplies power to the respective blocks of the automobile navigation equipment 2120 as shown in FIG. 21 via feeder lines which are partially shown as dotted lines in the figure. The battery 2138 accumulates the power provided from the vehicle.

In the automobile navigation equipment 2120 as shown in FIG. 21, the communication unit in the device 100 may be realized by the wireless communication interface 2133. At least a part of the functions of the channel detecting unit 102 and the coordinating unit 104 may also be realized by the processor 2121.

The technology of the present disclosure may also be realized as an in-vehicle system (or vehicle) 2140 comprising one or more blocks of the automobile navigation equipment 2120, the in-vehicle network 2141 and a vehicle module 2142. The vehicle module 2142 generates vehicle data (such as vehicle speed, engine speed and fault information), and outputs the generated data to the in-vehicle network 2141.

The preferable embodiments of the present disclosure have been described above with reference to the appended drawings. However, the present disclosure is of course not limited to the above examples. Those skilled in the art can carry out various alterations and modifications within the scope of the appended claims, and it should be understood that these alterations and modifications naturally will fall within the technical scope of the present disclosure.

For example, in the above embodiments, a plurality of functions incorporated in one unit may be realized by separate devices. Alternatively, in the above embodiments, a plurality of functions realized by a plurality of unite may be realized by separate devices, respectively. In addition, one of the above functions may be realized by a plurality of units. Of course, such configurations are included in the technical scope of the present disclosure.

In the specification, the steps as described in the flowcharts not only include processing executed in this order according to time sequence, but also include processing executed in parallel or separately but not necessarily according to time sequence. In addition, even in the steps of the processing according to time sequence, this order of course may also be properly changed.

Although the disclosure and advantages thereof have been described in detail, it should be understood that various changes, substitutions and transformations may be carried out without departing from the spirit and scope of the present disclosure as defined by the appended claims. Moreover, terms "include" and "comprise" or any other variants thereof in the embodiments of the present disclosure are intended to cover non-exclusive inclusion, such that a process, a method, an article or an apparatus including a series of elements not only includes those elements but also includes other elements not explicitly listed or but also includes elements intrinsic to such a process, method, article or apparatus. Without more limitations, elements defined by expression "including one . . . " do not exclude further existence of other identical elements in a process, a method an article or an apparatus including the elements.

The invention claimed is:

1. A device at transmitting side in a wireless communication system, the device comprising
a circuitry, configured to:
detect whether a transmitting side channel on an unlicensed frequency band is idle, and
cause, in a case where the transmitting side channel is idle, the transmitting side to broadcast an inter-operator coordination signal before transmitting a data stream, so as to realize information interaction between apparatuses of different operators,
wherein the inter-operator coordination signal is an energy pattern signal on a time domain-frequency domain plane utilizing presence absence of energy on a specified frequency band to realize the information interaction between the apparatuses of different operators,
wherein the inter-operator coordination signal includes at least one of a flag pattern and a link information pattern, the flag pattern being a periodic repeated energy pattern for which positions of sub-carriers carrying energy are predetermined, and the link information pattern being an encodable energy pattern for which positions and durations of sub-carriers carrying energy are variable.

2. The device according to claim 1, wherein the flag pattern is used to indicate stall of the inter-operator coordination signal, and the link information pattern is used to carry link information.

3. The device according to claim 2, wherein the link information comprises one or more of device type and serial number at the transmitting side, device type and serial number at a receiving side, operator information and an estimated channel occupation time.

4. The device according to claim 1, wherein the flag pattern comprises one of a pectination stripe pattern, a sawteeth pattern and a chessboard pattern, and the link information pattern comprises one of a stripe pattern, a barcode pattern and a two-dimensional code pattern.

5. The device according to claim 1, wherein the circuitry is further configured to cause, in a case where a notification indicating that a receiving side channel is busy is received from a receiving side, the transmitting side to stop broadcasting the inter-operator coordination signal.

6. The device according to claim 1, wherein the circuitry is further configured to control, in a case of uplink transmission, the transmitting side to send an uplink scheduling request to a base station according to the inter-operator coordination signal broadcast by an apparatus of another operator.

7. The device according to claim 1, wherein the circuitry is further configured to report, in a case of uplink transmission, link information determined according to the inter-operator coordination signal broadcast by an apparatus of another operator to a base station, to perform uplink scheduling by the base station.

8. The device according to claim 1, wherein the circuitry is further configured to realize unification with the inter-operator coordination signal of an apparatus of another operator by adjusting number of sub-carriers and or signal transmission duration of the inter-operator coordination signal.

9. The device according to claim 8, wherein the circuitry is further configured to adjust the number of sub-carriers and/or signal transmission duration of the inter-operator coordination signal according to a lease common multiple or a greatest common divisor of the number of sub-carriers and/or signal transmission duration of the inter-operator coordination signal.

10. A device at receiving side in a wireless communication system, the device comprising
a circuitry, configured to:
detect whether a receiving side channel on an unlicensed frequency band is idle; and
cause, in a case where the receiving side channel is idle, the receiving side to broadcast a shortened inter-operator coordination signal synchronously with an inter-operator coordination signal from a transmitting side, at a predetermined time alter the inter-operator coordination signal broadcast by the transmitting side is received, so as to realize information interaction between apparatuses of different operators,
wherein the inter-operator coordination signal is an energy pattern signal on a time domain-frequency domain plane utilizing presence/absence of energy on a specified frequency band to realize the information interaction between the apparatuses of different operators,
wherein the inter-operator coordination signal includes at least one of a flag pattern and a link information pattern, the flag pattern being a periodic repeated energy pattern for which positions of sub-carriers carrying energy are predetermined, and the link information pattern being an encodable energy pattern for which positions and durations of sub-carriers carrying energy are variable.

11. The device according to claim 10, wherein the flag pattern is used to indicate start of the inter-operator coordination signal, and the link information pattern is used to carry link information.

12. The device according to claim 10, wherein the circuitry is further configured to notify, in a case where it is detected the receiving side channel is busy, the transmitting side so that the transmitting side stops broadcasting the inter-operator coordination signal.

13. The device according to claim 10, wherein the circuitry is further configured to cause the receiving side to, after receiving a part of the flag pattern of the inter-operator coordination signal broadcast by the transmitting side to confirm that the transmitting side has broadcast the inter-operator coordination signal, broadcast the shortened inter-operator coordination signal synchronously with the inter-operator coordination signal of the transmitting side.

14. The device according to claim 10, wherein the circuitry is further configured to cause the receiving side to finish broadcasting the shortened inter-operator coordination signal before the transmitting side has finished broadcasting the inter-operator coordination signal.

15. The device according to claim 10, wherein the circuitry is further configured to perform, in a case of uplink transmission, uplink scheduling according to the inter-operator coordination signal broadcast by an apparatus of another operator.

16. The device according to claim 10, wherein the circuitry is further configured to perform, in a case of uplink transmission, uplink scheduling based on link information reported by the transmitting side and determined according to the inter-operator coordination signal broadcast by an apparatus of another operator.

17. A wireless communication system, comprising:
a transmitting apparatus comprising a first processing circuitry configured to:
detect whether a transmitting side channel on an unlicensed frequency band is idle, and
in a case where the transmitting side channel is idle, broadcast an inter-operator coordination signal before transmitting a data stream, so as to realize information interaction between apparatuses of different operators; and
a receiving apparatus comprising a second processing circuitry configured to:
detect whether a receiving side channel on the unlicensed frequency band is idle, and
in a case where the receiving side channel is idle, broadcast a shortened inter-operator coordination signal synchronously with an inter-operator coordination signal from the transmitting apparatus, at a predetermined time after the inter-operator coordination signal broadcast by the transmitting apparatus is received,
wherein the inter-operator coordination signal is an energy pattern signal on a time domain-frequency domain plane utilizing presence/absence of energy on a specified frequency band to realize the information interaction between the apparatuses of different operators,
wherein the inter-operator coordination signal includes at least one of a flag pattern and a link information pattern, the flag pattern being a periodic repeated energy pattern for which positions of sub-carriers carrying energy are predetermined, and the link information pattern being an encodable energy pattern for which positions and durations of sub-carriers carrying energy are variable.

18. A method at receiving side in a wireless communication system, the method comprising:
detecting whether a receiving side channel on an unlicensed frequency hand is idle; and
causing, in a case where the receiving side channel is idle, the receiving side to broadcast a shortened inter-operator coordination signal synchronously with an inter-operator coordination signal from transmitting side, at a predetermined time after the inter-operator coordination signal broadcast by the transmitting side is received, so as to realize information interaction between apparatuses of different operators,
wherein the inter-operator coordination signal is an energy pattern signal on a time domain-frequency domain plane utilizing presence/absence of energy on a specified frequency band to realize the information interaction between the apparatuses of different operators,
wherein the inter-operator coordination signal includes at least one of a flag pattern and a link information pattern, the flag pattern being a periodic repeated energy pattern for which positions of sub-carriers carrying energy are predetermined, and the link information pattern being an encodable energy pattern for which positions and durations of sub-carriers carrying energy are variable.

* * * * *